United States Patent
Doerr

(10) Patent No.: US 10,057,129 B2
(45) Date of Patent: *Aug. 21, 2018

(54) APPARATUS, SYSTEM, AND METHOD FOR ASYMMETRICAL AND DYNAMIC ROUTING

(71) Applicant: LEVEL 3 COMMUNICATIONS, LLC, Broomfield, CO (US)

(72) Inventor: Peter Brennan Doerr, Tulsa, OK (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,619

(22) Filed: May 1, 2017

(65) Prior Publication Data

US 2017/0237622 A1    Aug. 17, 2017

Related U.S. Application Data

(63) Continuation of application No. 14/177,925, filed on Feb. 11, 2014, now Pat. No. 9,641,438, which is a
(Continued)

(51) Int. Cl.
*H04L 12/24* (2006.01)
*H04Q 11/00* (2006.01)
*H04J 14/02* (2006.01)

(52) U.S. Cl.
CPC ...... *H04L 41/0896* (2013.01); *H04J 14/0257* (2013.01); *H04Q 11/0062* (2013.01)

(58) Field of Classification Search
CPC .. H04L 41/08; H04L 41/0896; H04J 14/0257; H04J 14/0254; H04J 14/0227; H04J 14/02
(Continued)

(56) References Cited

U.S. PATENT DOCUMENTS 5,471,334 A    11/1995    Masuda
5,748,629 A    5/1998    Caldara et al.
(Continued)

FOREIGN PATENT DOCUMENTS

EP    1158714 A2    11/2001

OTHER PUBLICATIONS

Extended European Search Report, dated Jun. 9, 2015, Application No. 12857873.9, filed Dec. 12, 2012; 8 pgs.
(Continued)

*Primary Examiner* — Kwang B Yao
*Assistant Examiner* — Syed M Bokhari

(57) ABSTRACT

A regenerator system is provided for dynamic and asymmetric bandwidth capacity adjustment when exchanging data between a first remote network device and a second remote network device. The regenerator includes first and second couplers in communication with the first and second remote network devices, respectively, using a first communication medium that provides multiple communication channels, and at least one redirecting device operable to selectively configure at least one of the channels for either transmission of a signal from the first remote network device to the second remote network device, or transmission of the signal from the second remote network device to the first remote network device.

7 Claims, 13 Drawing Sheets

Related U.S. Application Data continuation-in-part of application No. 13/647,368, filed on Oct. 8, 2012, now Pat. No. 8,849,112, which is a continuation-in-part of application No. 13/468,952, filed on May 10, 2012, now Pat. No. 8,285,141.

(60) Provisional application No. 61/576,090, filed on Dec. 15, 2011, provisional application No. 61/625,211, filed on Apr. 17, 2012.

(58) Field of Classification Search
USPC .................. 370/230; 398/175, 79, 118, 25
See application file for complete search history.

(56) References Cited

U.S. PATENT DOCUMENTS

| | | | |
|---|---|---|---|
| 5,825,752 | A | 10/1998 | Fujimori et al. |
| 5,912,889 | A | 6/1999 | Preas et al. |
| 6,289,152 | B1 | 9/2001 | Zhang et al. |
| 6,486,983 | B1 | 11/2002 | Beshai et al. |
| 6,538,784 | B1 | 3/2003 | Lee et al. |
| 7,039,706 | B1 | 5/2006 | Parker et al. |
| 7,050,718 | B2 | 5/2006 | Rychlicki |
| 7,215,678 | B1 | 5/2007 | Ahlfors et al. |
| 7,266,302 | B2 | 9/2007 | Bremner et al. |
| 7,308,197 | B1 | 12/2007 | Zhong et al. |
| 7,333,485 | B2 | 2/2008 | Witkowski et al. |
| 7,620,321 | B2 | 11/2009 | Miura et al. |
| 7,783,194 | B2 | 8/2010 | Hyndman et al. |
| 8,165,468 | B2 | 4/2012 | Boduch et al. |
| 2001/0038478 | A1 | 11/2001 | Hwang |
| 2002/0015552 | A1* | 2/2002 | Link .................. G02B 6/29358 385/24 |
| 2002/0019904 | A1 | 2/2002 | Katz |
| 2002/0181047 | A1* | 12/2002 | Lauder ................ H04B 10/506 398/79 |
| 2003/0020982 | A1 | 1/2003 | Rychlicki |
| 2003/0067645 | A1* | 4/2003 | Ibsen ...................... G01J 3/02 398/79 |
| 2003/0081293 | A1* | 5/2003 | Wood, Jr. ........... H04B 10/1121 398/126 |
| 2004/0068589 | A1 | 4/2004 | Witkowski et al. |
| 2004/0136381 | A1 | 7/2004 | Kinstler |
| 2004/0156312 | A1 | 8/2004 | Salonidis et al. |
| 2005/0207756 | A1 | 9/2005 | Tanaka et al. |
| 2006/0098981 | A1 | 5/2006 | Miura et al. |
| 2007/0003283 | A1 | 1/2007 | Feuer et al. |
| 2007/0058986 | A1* | 3/2007 | Butler .................... H04B 10/29 398/175 |
| 2007/0183786 | A1 | 8/2007 | Hinosugi et al. |
| 2007/0217406 | A1 | 9/2007 | Riedel et al. |
| 2009/0232497 | A1 | 9/2009 | Archambault et al. |
| 2010/0303459 | A1* | 12/2010 | Yuki ................ H04B 10/25133 398/25 |
| 2012/0263476 | A1* | 10/2012 | Sabet ................. H04B 10/0705 398/104 |
| 2013/0170344 | A1 | 7/2013 | Crowe et al. |
| 2014/0161449 | A1 | 6/2014 | Doerr |

OTHER PUBLICATIONS

International Preliminary Report on Patentability, dated Jun. 17, 2014, Int'l Appl. No. PCT/US12/069237, Int'l Filing Date Dec. 12, 2012; 8 pgs.

International Search Report, dated Feb. 20, 2013, Int'l App. No. PCT/US12/069237, Int'l Filing Date Dec. 12, 2012, 3 pgs.

Written Opinion, dated Feb. 20, 2013, Int'l App. No. PCT/US12/069237, Int'l Filing Dated Dec. 12, 2012, 5 pgs.

Jintae, Yu et al., "Upgrade design of survivable wavelength-routed networks for increase of traffic loads", *Optical Network Design and Modeling* Conference on Milan, Italy,, Piscataway, NJ, USA, IEEE, XP010793196 Feb. 7, 2005 , pp. 163-174.

Papadimitriou, G. I. et al., "Adaptive Bandwidth Allocation Schemes for Lightwave Lans with Asymmetric Traffic", Conference Proceedings of the 2001 IEEE International Performance, Computing, and Communications Conference (IPCCC); XP001049939 Apr. 4, 2001 , pp. 45-50.

European Result of Consultation, dated Jan. 18, 2018, Application No. 12857873.9, filed Dec. 12, 2012; 2 pgs.

* cited by examiner

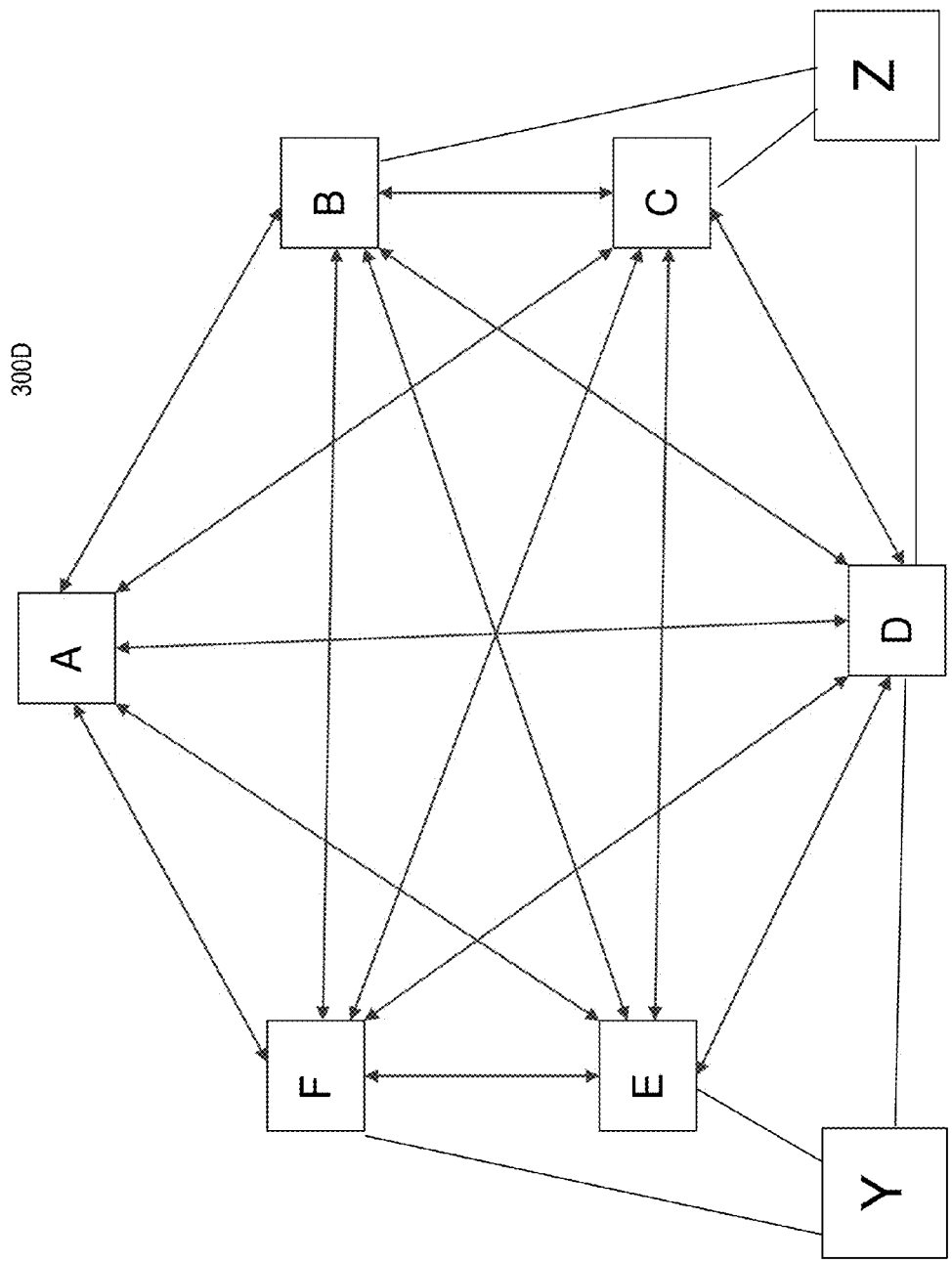

APPARATUS, SYSTEM, AND METHOD FOR ASYMMETRICAL AND DYNAMIC ROUTING

CROSS REFERENCE TO RELATED APPLICATIONS

This application is a continuation of and claims the benefit of priority to co-owned U.S. patent application Ser. No. 14/177,925 titled "APPARATUS, SYSTEM, AND METHOD FOR ASYMMETRICAL AND DYNAMIC ROUTING," filed on Feb. 11, 2014, the entire contents of which are fully incorporated by reference herein for all purposes. Application Ser. No. 14/177,925 is a continuation-in-part of and claims the benefit of priority to co-owned U.S. patent application Ser. No. 13/647,368 titled "APPARATUS, SYSTEM, AND METHOD FOR ASYMMETRICAL AND DYNAMIC ROUTING," filed on Oct. 8, 2012, now U.S. Pat. No. 8,849,112, the entire contents of which are fully incorporated by reference herein for all purposes. Application Ser. No. 13/647,368 is a continuation-in-part of and claims the benefit of priority to co-owned U.S. patent application Ser. No. 13/468,952 titled "APPARATUS, SYSTEM, AND METHOD FOR ASYMMETRICAL AND DYNAMIC ROUTING," filed on May 10, 2012, now U.S. Pat. No. 8,285,141, the entire contents of which are fully incorporated by reference herein for all purposes. Application Ser. No. 13/468,952 claims priority from U.S. provisional application No. 61/576,090 titled "APPARATUS, SYSTEM, AND METHOD FOR ASYMMETRICAL AND DYNAMIC ROUTING," filed on Dec. 15, 2011 and to U.S. provisional application No. 61/625,211 titled "APPARATUS, SYSTEM, AND METHOD FOR ASYMMETRICAL AND DYNAMIC ROUTING," filed on Apr. 17, 2012, the entire contents of which are fully incorporated by reference herein for all purposes.

TECHNICAL FIELD

Aspects of the present disclosure relate to communication networks and, in particular, to an apparatus, method, and system for dynamically adjusting the bandwidth capacity of two or more network devices exchanging data in a communication network.

BACKGROUND

The explosive growth of data communication networks, particularly the Internet, presents tremendous opportunities and tremendous challenges for service providers. One such challenge involves keeping up with the demand for bandwidth created by new users, new technologies, and new high-bandwidth applications. For example, a media on demand service provider often transmits bandwidth demanding multi-media content, such as video, to a requesting client or end user.

Due to the dynamically changing nature of traffic carried on networks, service providers need the capability to flexibly scale and cost-effectively allocate network resources to provide required bandwidth. Currently, to address these dynamically changing bandwidth requirements, service providers have little choice but to engineer their networks for "worst-case" traffic volumes, which allows them to meet service commitments but results in under-utilized network resources. Furthermore, when traffic patterns change to an extent that requires reconfiguration of their networks, service providers must manually engineer and provision new connections at both the logical (packet) and physical and/or optical layers of the network, which can be an expensive, complex, and time-consuming task.

An incoming request to a multi-media service provider typically includes very little content as compared to the response which can include a large amount of content. For example, when requesting a movie in a content delivery network, the request for the content itself has very little data whereas the delivery of the movie may involve gigabytes of data. Thus, there is a bandwidth mismatch where communicating the request to the service provider over the network requires minimal bandwidth, but sending the response with the requested content may require significant bandwidth. Local Area Networks (LAN's), Metropolitan Area Networks (MAN's), and Wide Area Networks (WAN's) along with routing devices and network switches (such as IP routers, Frame Relay switches and Asynchronous Transfer Mode switches) interconnected over a Transport Network (such as SONET or G.709) are often used to manage such requests and responses between multiple end users and the service provider. These devices can be implemented by various types of switches and/or network devices including, but not limited to asynchronous transfer mode (ATM) switches, frame relay switches, and internet protocol (IP) switches. Unfortunately, due to bandwidth limitations of conventional network devices and the disproportional bandwidth requirement between requests and responses, such network devices often reach their bandwidth capacity before responding to all requests and, thus, end users can experience significant latency delays when requesting content, while at the same time leaving significant bandwidth idle and unused.

Service providers have used Dense Wavelength Division Multiplexing (DWDM) technology to facilitate the transmission large amounts of content. DWDM is a technology that increases the capacity of an optical fiber by first assigning incoming optical signals to specific wavelengths of light (colors) within a designated band and then combining or multiplexing multiple optical signals so that they can be amplified as a group and transmitted over a single fiber or pair of fibers to increase capacity. Each optical signal can be transmitted at a different rate and in a different format. DWDM applications include ultra-high bandwidth long haul as well as ultra-high-bandwidth metropolitan or inner city-networks, and access networks that are closer to the end user such as SONET, Internet protocol (IP), and asynchronous transfer mode (ATM) networks.

Conventional DWDM systems use a fixed channel plan that may include, for example, 40 separate wavelengths (e.g., from 1528 nm to 1560 nm; a 40 channel systems uses 100 GHz spaced where an 80 channel system may use 50 GHz). Typically, optical signals can be sent across the fiber in the direction from a network A to a network B or from network B to network A. Network devices may receive inputs from all directions, but if the end destination is in common for all those inputs, then there can be a buffer fill and overload creating a data bottleneck where data must stream out a fixed capacity, bi-directional transport port. Thus, a "pipe" may be fully utilizing the A to B direction, while the B to A direction is nearly empty.

It is with these issues in mind, among others, that various aspects of the present disclosure were developed.

SUMMARY

According to one aspect, a regenerator system is provided for dynamic and asymmetric bandwidth capacity adjustment when exchanging data between a first remote network device and a second remote network device. The regenerator includes first and second couplers in communication with the first and second remote network devices, respectively, using a first communication medium that provides multiple communication channels, and at least one redirecting device operable to selectively configure at least one of the channels for either transmission of a signal from the first remote network device to the second remote network device, or transmission of the signal from the second remote network device to the first remote network device.

According to another aspect, a method for adjusting bandwidth capacity between a first remote network device and a second remote network device includes selectively configuring, using at least one redirecting device, at least one of a plurality of communication channels of a communication medium for either transmission of a signal from the first remote network device to the second remote network device, or transmission of the signal from the second remote network device to the first remote network device. The regenerator includes a first coupler in communication with the first remote network device, and a second coupler in communication with the second remote network device.

According to yet another aspect, a communication device includes a transmit/receive (T/R) module and multiple first and second optical redirecting elements. The T/R module includes a receive portion that receives a light signal and a transmit portion that transmits the light signal. The first optical redirecting elements selectively direct the light signal between a first port and either the transmit portion or the receive portion of the T/R module, while the second optical redirecting elements selectively direct the light signal between a second port and either the transmit portion or the receive portion of the T/R module.

When used in DWDM systems, regenerators are often used to enhance DWDM signals, such as by re-amplifying, re-shaping, and/or re-synchronizing the DWDM signals. When used with asymmetric DWDM systems, these regenerators should be able to re-direct certain wavelengths of DWDM signals between eastbound and westbound directions.

BRIEF DESCRIPTION OF THE DRAWINGS

FIG. 3D is a block diagram of multiple network devices connected in a mesh configuration according to one aspect of the asymmetrical and dynamic routing system.

DETAILED DESCRIPTION

Aspects of an asymmetrical and dynamic routing system (ADRS) and a network device described herein enable the dynamic adjustment of the bandwidth capacity of one or more network devices in communication within a network or between networks. The ADRS includes two or more network devices that are aware of the current total capacity of bandwidth between two or more network devices. The two or more network devices are also configured to monitor their current incoming bandwidth demands between themselves and subsequently transmit bandwidth requests and responses to those requests between each other, and/or relay capacity requests from a different part of the network in a much larger network. The network device is configured with additional transmit and receive ports that can be selectively enabled in response to a bandwidth request from other network devices or other devices in the network. The network devices may also be configured to monitor the bandwidth (e.g., whether active, idle, near full, or near empty) on other inbound and outbound ports that may be destined for transmission between the two or more network devices. The router, in one particular configuration, is configured to generate control signals that are sent to optical mirrors, prisms, or other optical redirecting elements can redirect light, to direct data signals from or to the one or more enabled additional transmit and receive ports, respectively. Thus, the network device may dynamically adjust the bandwidth by reusing the same wavelength channel (in effect reversing its direction. This is done by enabling or activating additional idle transmit and/or receive ports in a one direction (e.g., A to B), while at the same time disabling or deactivating an additional active receive and/or transmit ports in an opposite direction (e.g., B to A) direction to increase overall asymmetric throughput and thereby reduce short term or long term latency, bottlenecks, and/or congestion when transmitting high bandwidth demanding data.

Although asymmetric routing management may enhance the overall capacity of communication links, it may be difficult to implement in communication links that span long distances. For example, to span long distances, communication links are provided with regenerators configured approximately mid-range between each endpoint. Nevertheless, to implement asymmetric bandwidth management on links having long spans, the regenerators should also be capable of assisting in asymmetric routing.

Figure 1:
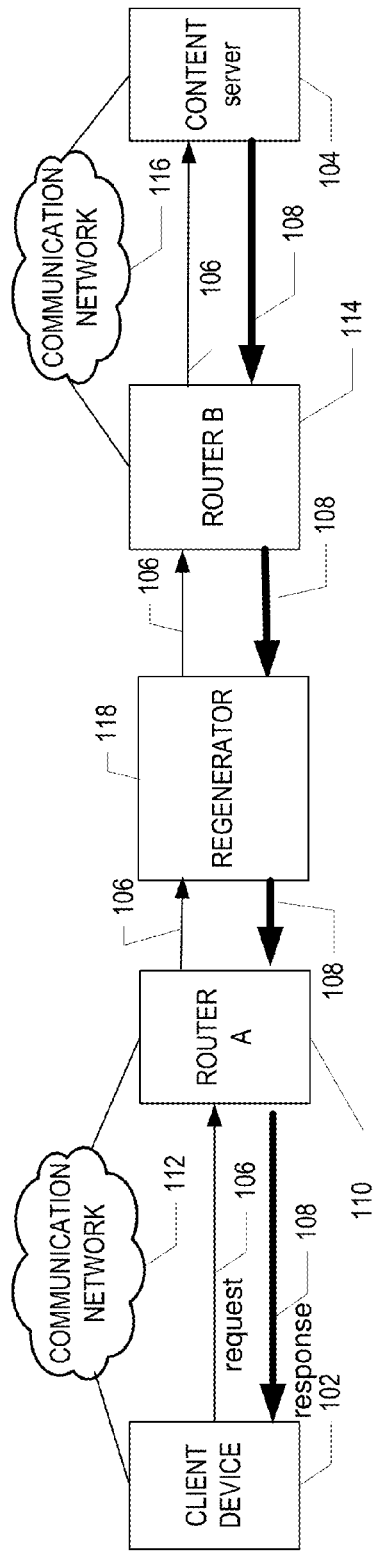
FIGS. 1 and 2 are block diagrams that illustrate a request and response communicated between a client device and a content server using network devices.

FIG. 1 is a block diagram that depicts data communications between network devices connected to two different communication networks. For example, although the communication networks are different and each may comprise different hardware (e.g., network devices manufactured by different vendors), both communication networks may utilize the same communication protocol. For example, the communication protocol may be an existing communication protocol, which may be an accepted industry standard protocol or proprietary protocol that has been approved by any national or international standard authority, such as SONET, which is a standard for connecting fiber-optic transmission systems or proprietary protocol developed by vendors for a closed or private system. Alternatively, the communication protocol may be some other communication protocol that is used by both communication networks to exchange data. As a result, a requesting device, such as a client device 102, and a responding device, such as a content server 104, maintained by a service provider can exchange data communications between the two communication networks.

In operation, the client device 102 sends a request 106 for content, such as streaming video, to a server device by way of a network device A 110 via a communication network 112, such as a Local Area Network (LAN). As used herein, a network device is, for example, a router or other suitable networking equipment such as a switch, gateway, or other devices. The network device A 110 may transmit the request 106 to a network device B 114 that communicates the request 106 to the data/content server 104 via another communication network 116, such as another LAN. A wide area network (WAN) (not shown) may be used to connect the communication network 112 to the communication network 116. Additionally as shown, the request 106 may be conveyed through a regenerator 118 that applies and otherwise filters the request 106 to improve its signal quality as seen by the network device B 114.

The server 104 sends a response 108, such as streaming video, to network device B using the communication network 116. Network device B 114 transmits the response through the regenerator 118 to network device A 110 that communicates the response 108 to client device 102 using the communication network 112. Thus, the above network device configuration enables the transmission of information and data between different types of communication networks.

The request 106 typically includes minimal data relative to the data included in the response 108. In the example of streaming media, the request 106 may be an HTTP request, such as when a link at a web page is selected from a browser, that includes a network address or other form of location data for the client device 102 from which the request is made, and includes an identification of the requested streaming media content. In addition to source and destination information, the response 108 further includes the requested content in one or more data packets. In the particular example of streaming media, the response will often be a large number of data packets depending on the size of the selected media. To add to the asymmetrical nature of this type of network, multiple client devices 102 may each send a content request 106 to the content server 104, the bandwidth required by the network device 114 to transmit the responses 108 each client 102 is typically much greater than the bandwidth required by the network device 110 to transmit the requests 106. These bandwidth discrepancies may, in part, result from communication networks 112 and 116 having different data transfer rates. For example, the data rate of communication network 112 may be 10 megabytes per second (Mb/s) while the data rate of communication network 116 may be 100 Mb/s. As a result, network device B 114 will typically reach its bandwidth capacity well before network device A 110 reaches its bandwidth capacity, and it is often the case that network device A simply will not reach its capacity. Although the response 108 is described as including streaming video content or other forms of media content, it is contemplated that other forms of requested data or content can also result in a disparate data amounts between a particular request and corresponding response.

Figure 2:
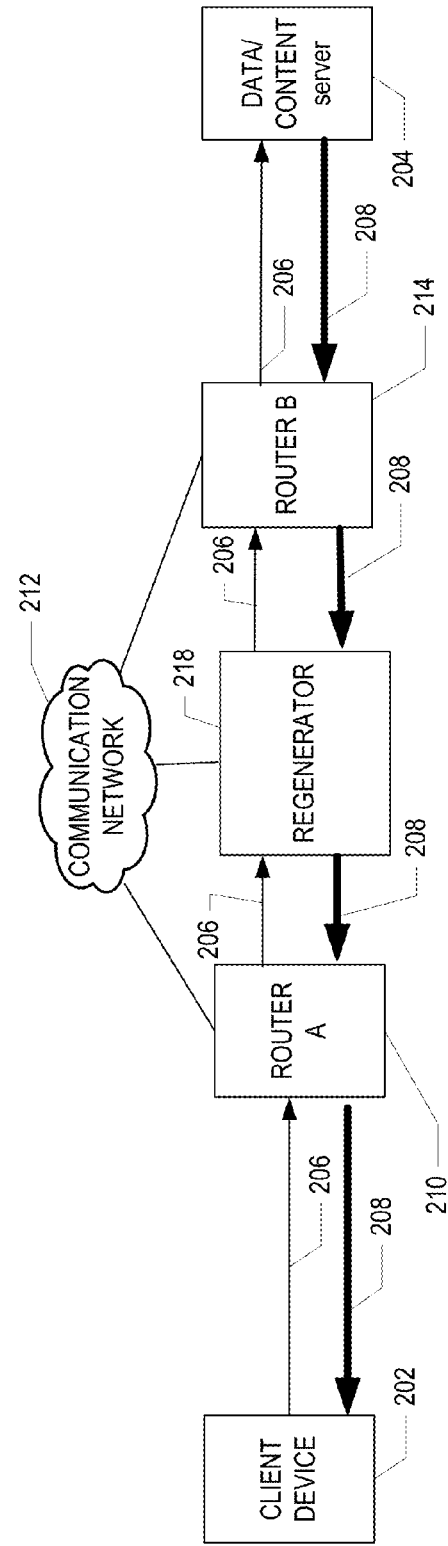

FIG. 2 is a block diagram that depicts data communications between network devices within the same communication network. In this example, a requesting device, such as a client device 202, and a responding device, such as a content server 204, maintained by a service provider exchange data communications via the same communication network. The single communication network facilitates communication between multiple network devices that are each configured to use a communication protocol that enables dynamic bandwidth adjustment between the multiple network devices (e.g., two or more) as described herein. Thus, although one or more of the multiple network devices may be manufactured by different vendors, all of the network devices are each configured to communicate with each other using such a communication protocol and/or pass on to nodes not directly connected.

In this example, the client device sends a request 206 for content, such as streaming video, to a server hosting or otherwise managing access and delivery of the content through network 212. In this example, two network devices A and B along with a regenerator 218, among possibly many others are involved in routing the content between the server and the client. Thus, the above network device configuration enables the transmission of information between network devices within the same network or any network device configured as described herein. The ADRS described herein can be implemented in the networks configuration depicted in FIG. 1, FIG. 2 or any other network configuration that includes at least two network devices.

Figure 3A:
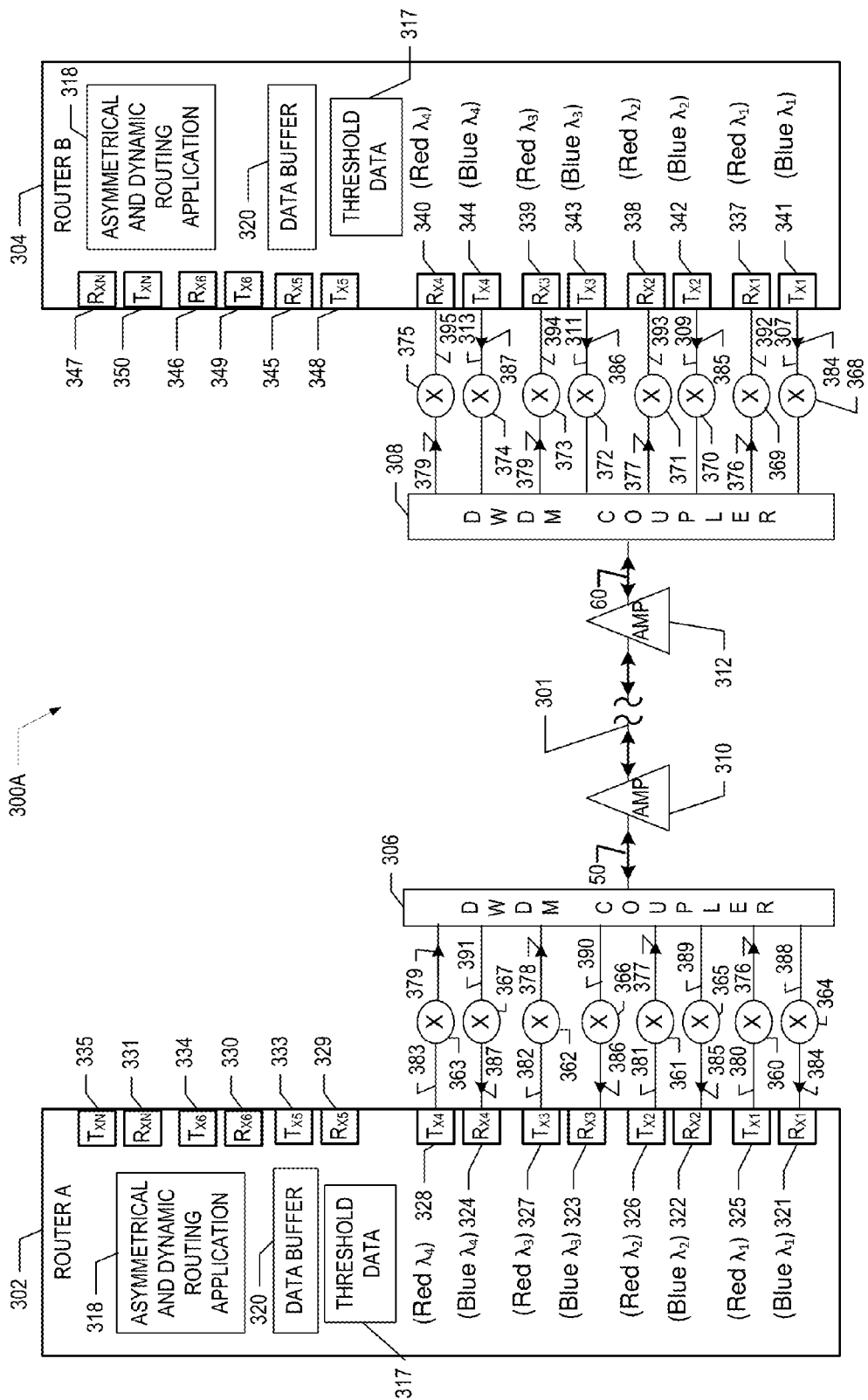
FIGS. 3A through 3C are block diagrams of communication environments according to aspects of an asymmetrical and dynamic routing system.
Figure 3B:
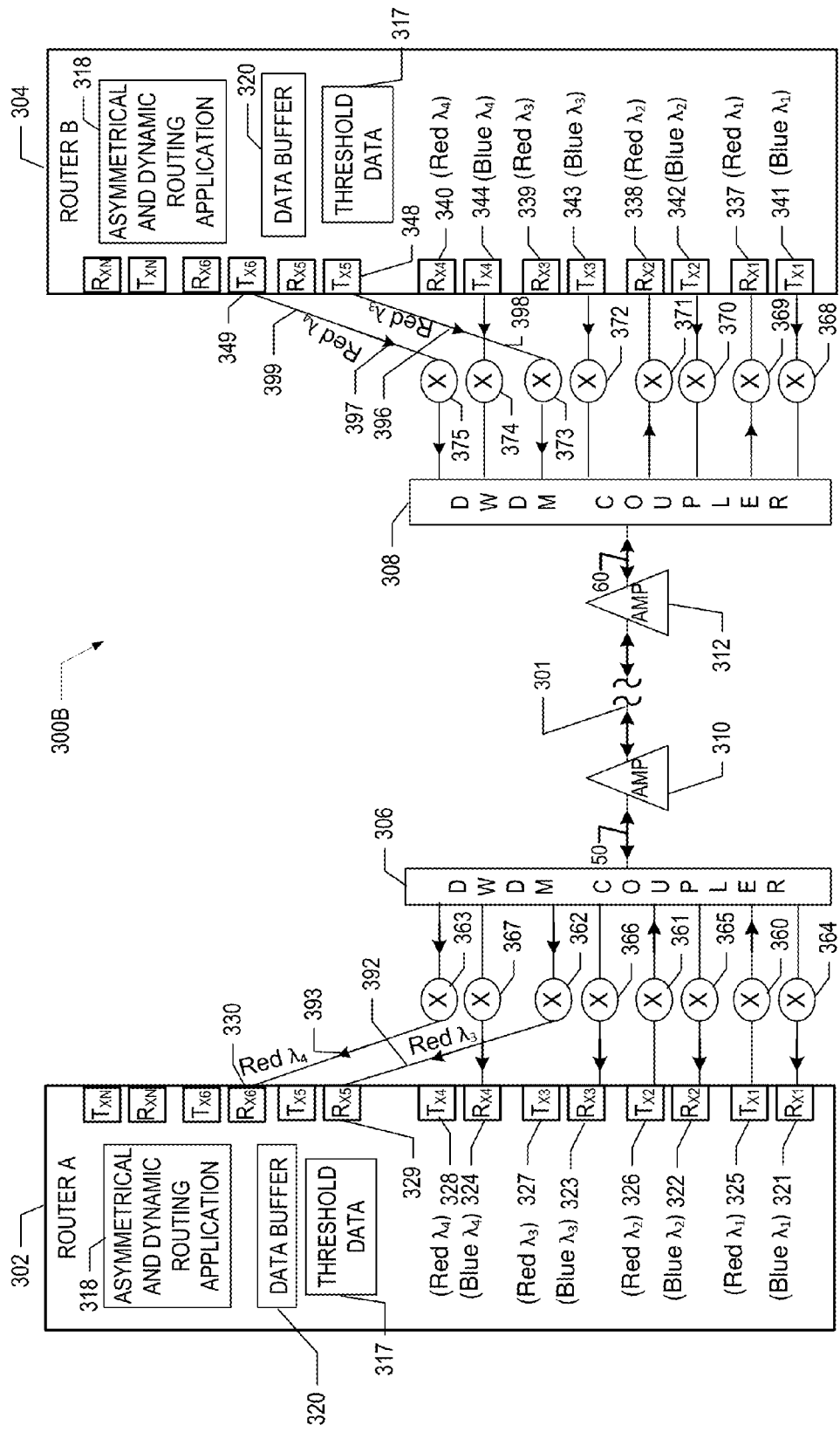

FIGS. 3A and 3B depict exemplary modes of operation of an ADRS according to aspects of the present disclosure. As used herein, the term "exemplary" is meant to refer to an example or illustration of one possible implementation or arrangement of some aspect of the present disclosure.

According to one aspect, the ADRS employs a Dense Wavelength Division Multiplexing (DWDM) Transmit system that is configured, for example, to transmit eight (8) wavelengths (four reds and four blues, as described below) of any data rate bi-directionally. As described above, DWDM is a technology that increases the capacity of an optical fiber by first assigning incoming optical signals to specific wavelengths of light (colors) within a designated band and then combining or multiplexing multiple optical signals so that they can be amplified as a group and transmitted over a single fiber or pair of fibers to increase capacity. The multiple wavelengths of light define communication channels that independently transmit the multiple optical signals in a communication medium, which in a DWDM system, is a fiber optic cable. Each optical signal can be at a different rate and in a different format. DWDM applications include ultra-high bandwidth long haul as well as ultra-high-bandwidth metropolitan or inner city-networks, and access networks that are closer to the end user such as G.709, SONET, Internet protocol (IP), and asynchronous transfer mode (ATM) networks. Typical DWDM systems International Telecommunications Union (ITU) channel plans today use 40 wavelengths utilizing a 100 THz channel spacing, or 80λ utilizing 50 THz spacing, etc. However, for the purposes of illustration, the ADRS is described herein as using eight (8) wavelengths λ.

FIG. 3A depicts an exemplary embodiment of an ADRS 300A according to one aspect of the present disclosure. The ADRS 300 includes a network device A 302, a network device B 304, DWDM couplers 306, 308, amplifiers 310, 312, and light redirecting components 360-375 and "in the ground" fiber 301 (note, this could be bi-directional across one fiber (blues one way, reds the other) or uni-directional across 2 fibers where each fiber has all 8 wavelengths, one fiber is A to B, the other fiber is B to A), along with all the other "inside" fibers 376-387. The example herein discusses implementation of the system using network devices; however, other network devices such as switches may also employ aspects of the disclosure. The light redirecting components 360-375 may include light re-directing devices, such as rotatable mirrors, light re-directing devices and/or, light refracting devices, such as liquid and/or prism based refracting devices, or other light redirecting devices. The light redirecting components are configured to receive instructions from the ADRS and may be housed in a common unit. Network device A 302 and network device B 304 communicate data signals between each other and each include an asymmetrical and dynamic routing application (ADRA) 318 and a data buffer 320. The data buffer may be a buffer or queue for temporarily holding data before it is redirected to the proper exit port. As used herein, the terms communicate data or communicating data include transmitting and/or receiving data. In a DWDM sense, couplers 306, 308 generally refer to passive components, such as connectors that are incapable of communications without additional active components.

Network device A 302 and network device B 304 also include one or more processors, buffers, and memory and are configured to receive data and/or communications from, and/or transmit data and/or communications to each other. Network device A 302 includes receive ports 321-324, transmit ports 325-328, and idle ports 329-335. Network device B 304 includes receive ports 337-340, transmit ports 341-344, and idle ports 345-350. Any given network device conforming to aspects of the present disclosure may include various possible numbers of ports (or cards) with proportional number of light re-directing components. The ports may be electronic or optical or a hybrid. The signal is eventually converted to optical form for the transmission over fiber. In this example, a particular wavelength (or channel) is assigned to the receive ports 321-324 and 337-340 and transmit ports 325-328 and 341-344 such that they each can receive and transmit data at a specified wavelength, $\lambda_x$. Different optical channels can carry different data (e.g., voice, data, video, data packets) at different rates. The wavelengths may be distinguished by different colors. For example, the spectral area may be separated into numerous distinct color bands which are separately managed. While each of the transmit ports in FIG. 3A are generally hard coded to transmit a data signal at specified wavelength, they can also be selected via executable software or instructions to choose a desired wavelength. The receive ports can be wide band receive ports such that they can receive a data signal at any specified wavelength.

In the bi-directional mode of operation depicted in FIG. 3A, receive port 321 and transmit port 325 of network device A 302 and receive port 337 and transmit port 341 of network device B 304 communicate data at a first specified wavelength pair $\lambda_1$ (which may be red $\lambda_1$ from A to B and blue $\lambda_1$ from B to A), receive port 322, transmit port 326, receive port 338, and transmit port 342 communicate data at a second specified wavelength pair $\lambda_2$ (which may be red $\lambda_2$ A to B and blue $\lambda_2$ from B to A), receive port 323, transmit port 327, receive port 339, and transmit port 343 communicate data at a third specified wavelength pair $\lambda_3$ (which may be red $\lambda_3$ from A to B and blue $\lambda_3$ from B to A), and receive port 324, transmit port 328, receive port 340, and transmit port 344 communicate data at a fourth specified wavelength pair $\lambda_4$ (which may be red $\lambda_4$ from A to B and blue $\lambda_4$ from B to A). Moreover, in this example, each of the receive ports 321-324 and 337-340 and transmit ports 325-328 and 341-344 each have a bandwidth capacity of bidirectional 10 gigabytes of data per second (10 Gb/s). Thus, both network device A 302 and network device B are configured to transmit a total of 40 Gb/s and to receive a total of 40 Gb/s in a fully even bidirectional condition. Each port, however, may be of any data rate, and may mix and match various different data rates and or protocols. For example ports $T_{x1}/R_{x1}$ could be 10 GigE, while port $T_{x2}/R_{x2}$ could be a 43 Gb/s G.709 OTU3. Either way, if a buffer for a network device is full, capacity requests could be sent out to reallocate wavelength channels to alleviate congestion.

Network device A 302 transmits a plurality of optical data signals (data signals) 376-379 via fibers 380-383 and light re-directing components 360-363 to the DWDM coupler 306. The DWDM coupler 306 then combines or multiplexes the multiple data signals 376-379 and sends to the amplifier 310 via a single fiber 50 so that they can be amplified as a group by the amplifier 310 across fiber 301 to amplifier 312 which are then transmitted over another single fiber 60 to coupler 308 for demuxing back into individual channels.

The DWDM coupler 308 receives the combined data signal and demultiplexes the combined data signal back into individual the multiple data signals 376-379. Network device B 304 receives data signals 376, 377, 378, and 379 at receive ports 337, 338, 339, and 340, respectively, from the DWDM coupler 308 via fibers 392-395. In this example, each of the receive ports 337-340 and transmit ports 341-344 also have a bandwidth capacity of 10 gigabytes per second (10 Gb/s) of bidirectional traffic per channel.

Similarly, network device B 304 transmits a plurality of different data signals 384-387 via fibers 307, 309, 311, and 313, light re-directing components 368, 370, 372, and 374, and corresponding fibers to the DWDM coupler 308, then combines or multiplexes the multiple data signals 384-387 into a single fiber (e.g., fiber 60) so that they can be amplified as a group by the amplifier 312 and transmitted over the same single fiber 301 to coupler 306 for demuxing in various possible implementations, a single fiber may be used and data/content is transmitted bidirectionally or a pair of fibers are used with unidirectional traffic on each fiber.

The DWDM coupler 306 receives the combined data signal and demultiplexes the combined data signal into the multiple data signals 384-387. Network device A 302 receives data signals 384, 385, 386, and 387 at receive ports 321, 322, 323, and 324, respectively, from the DWDM coupler 306 via fibers 388-391. In this example, each of the receive ports 321-324 and 337-340 and transmit ports 325-328 and 341-344 also have a bandwidth capacity of 10 Gb/s).

In addition to receive ports 321-324 and transmit ports 325-328, network device A 302 includes an additional set of receive ports 329-331 and an additional set of transmit ports 333-335. In addition to receive ports 337-340 and transmit ports 341-344, network device B 304 includes an additional set of receive ports 345-347 and an additional set of transmit ports 348-350. In the mode of operation depicted in FIG. 3A, the additional receive ports 329-331 of network device A 302 are idle along with transmit ports 348-350 of network device B 304, but can be enabled in response to an authorized bandwidth notification received from network device B 304. Similarly, the additional receiving ports 345-347 of device B 304 and transmit ports 333-335 of network device A 302 are idle, but can be enabled in response to an different authorized bandwidth notification received from network device A 302. Although network device A 302 and network device B 304 are each depicted herein as including three idle receive ports and three idle transmit ports, it is contemplated that in other aspects they may each include fewer or more active and/or idle receive ports and idle transmit ports. When network devices A and B (or otherwise) agree to activate or deactivate certain ports based on overall network wide bandwidth requirements (or more local bandwidth requirements), the network devices may redirect or allocate certain waves to change direction.

According to one aspect, the data buffer 320 stores data in a buffer or queue wanting to exit the correct port. The ADRS stores or otherwise has access to threshold port bandwidth data for the corresponding router. The data buffer 320 can be a database or a memory within the network device (e.g., network device A 302 or network device B 304). The threshold port bandwidth data identifies a maximum bandwidth capacity of each transmit port and receive port for the corresponding router. For example, the threshold port bandwidth of network device A 302 indicates the maximum bandwidth capacity for each of receive ports 321-324 and 329-331 and each of transmit ports 325-328 and 333-335. In this example, and for purposes of illustration, the threshold port bandwidth data indicates that the maximum bandwidth capacity for each transmit port and receive port of network device A 302 and network device B 304 is 10 Gb/s. It is contemplated that in other aspects the maximum bandwidth capacity may be greater or less than 10 Gb/s and that each port may have a different maximum bandwidth capacity.

In this example, the light redirecting components 360-375 are optical reflectors or switches, such as rotatable microelectromechanical system ("MEMS") micromirrors, that are controllable to redirect or reflect/refract a specific wavelength data signal to a new receive port and/or receive a data signal from a new transmit port. For example, network device A 302 transmits data signals 376-379 via fibers 380-383, respectively, to the DWDM coupler 306 for multiplexing. Network device A 302 also receives data signals 384-387 via fibers 388-391, respectively, from the DWDM coupler 306. The light redirecting components 360-363 are positioned along the fibers 380-383, respectively, between the transmit ports 325-328 and the DWDM coupler 306 as well as fibers to receive ports 329-331. The light redirecting components 364-367 are positioned along the fibers 388-391, respectively, between the receive ports 321-324 and the DWDM coupler 306. At least some of the light redirecting components 360-363 are switchably connected to the idle receive ports 329-331 and at least some of the light redirecting components 364-367 are switchably connected to the idle transmit ports 333-335.

FIG. 3A depicts the transmission of the data signals 384-387 from transmit ports 341-344 of network device B 304 to the corresponding receive ports 321-324 of network device A 302 before network device B 304 has reached or nearly reached its bandwidth capacity. After network device B 304 has reached or nearly reached bandwidth capacity, network device B 304 executes the ADRA 318 to enable one or more of its idle transmit ports 348-350 to transmit one or more additional data signals and to send a bandwidth request to network device A 302. Network device A 302 executes the ADRA 318 to determine if excess bandwidth capacity is available at network device A 302 and to redirect the one or more additional data signals to one or more newly enabled receive ports 329-331 at network device A 302 if bandwidth capacity is available. If Network device A 302 accepts the bandwidth request, then the corresponding wavelength/channel will change direction. For example, light redirecting devices 362 and 373 associated wavelength/channel for transmitting red $\lambda_3$ wavelengths from A to B will toggle at to allow the newly enabled receive port 329 at network device A 302 and transmit port 348 at network device B 304 to become active and make $\lambda_3$ now reversed or reused and transmitting from network device B 304 to network device A 302).

In operation, the network device A 302 may be used to route or transmit requests for bandwidth demanding content, such as video. Network device B 304 receives the content request and manages the routing of responses with the requested content back to network device A 302. As described above, the request for such content typically requires very little bandwidth but the response can require significant bandwidth. Although network device A 302 can continue to transmit new requests for such content, because of the limited bandwidth network devices can transmit per port, network device B 304 may reach bandwidth capacity, and, thus, responses to new requests will be delayed. This increased latency can adversely affect an end users perception of a particular web service from which the content is being requested.

In another mode of operation of an ADRS 300B depicted in FIG. 3B, the ADRA 318 executed on network device B 304 has enabled transmit ports 348-349 and has positioned or shifted light redirecting components 373 and 375 to transmit additional data signals 396, 397 via fibers 398, 399, respectively, to the DWDM coupler 308. The ADRA 318 executed on network device A 302 has enabled receive ports 329-330 and has positioned or shifted the light redirecting components 362 and 363 to direct the additional data signals 396, 397 at their corresponding wavelengths via fibers 392, 393 to the receive ports 329, 330. As a result, network device A 302 can receive data signals at six (6) receive ports 321-324, 329, and 330 and can transmit data from two (2) transmit ports 325, 326. Network device B 304 can transmit data signals from six (6) transmit ports 341-344, 348, and 349 and can receive data at two (2) receive ports 337, 338. As an example, enabled transmit port 348 of network device B 304 transmits an additional data signal at the third specified wavelength Red $\lambda_3$ and enabled receive port 329 on network device A 302 receives the additional data signal at the third specified wavelength Red $\lambda_3$. As another example, enabled transmit port 349 of network device B 304 transmits an additional data signal at the fourth specified wavelength Red $\lambda_4$ and enabled receive port 330 of network device A 302 receives the additional data signal at the fourth specified wavelength Red $\lambda_4$.

Thus, instead of network device A 302 being configured to transmit a maximum bandwidth of 40 Gb/s to network device B 304, network device A 302 is dynamically configured to transmit a maximum bandwidth of 20 Gb/s to network device B 304. Moreover, instead of network device B 304 being configured to transmit a maximum bandwidth of 40 Gb/s to network device A 302, network device B 304 is dynamically configured to transmit a maximum bandwidth of 60 Gb/s to network device A 302. By enabling a particular network device that has reached or is reaching its maximum bandwidth capacity to leverage available and excess bandwidth capacity at a remote router, that particular network device can dynamically increase its throughput to handle large short term or even long term bursts and to reduce latency or lag when transmitting high bandwidth demanding data in an unpredictable environment.

Figure 3C:
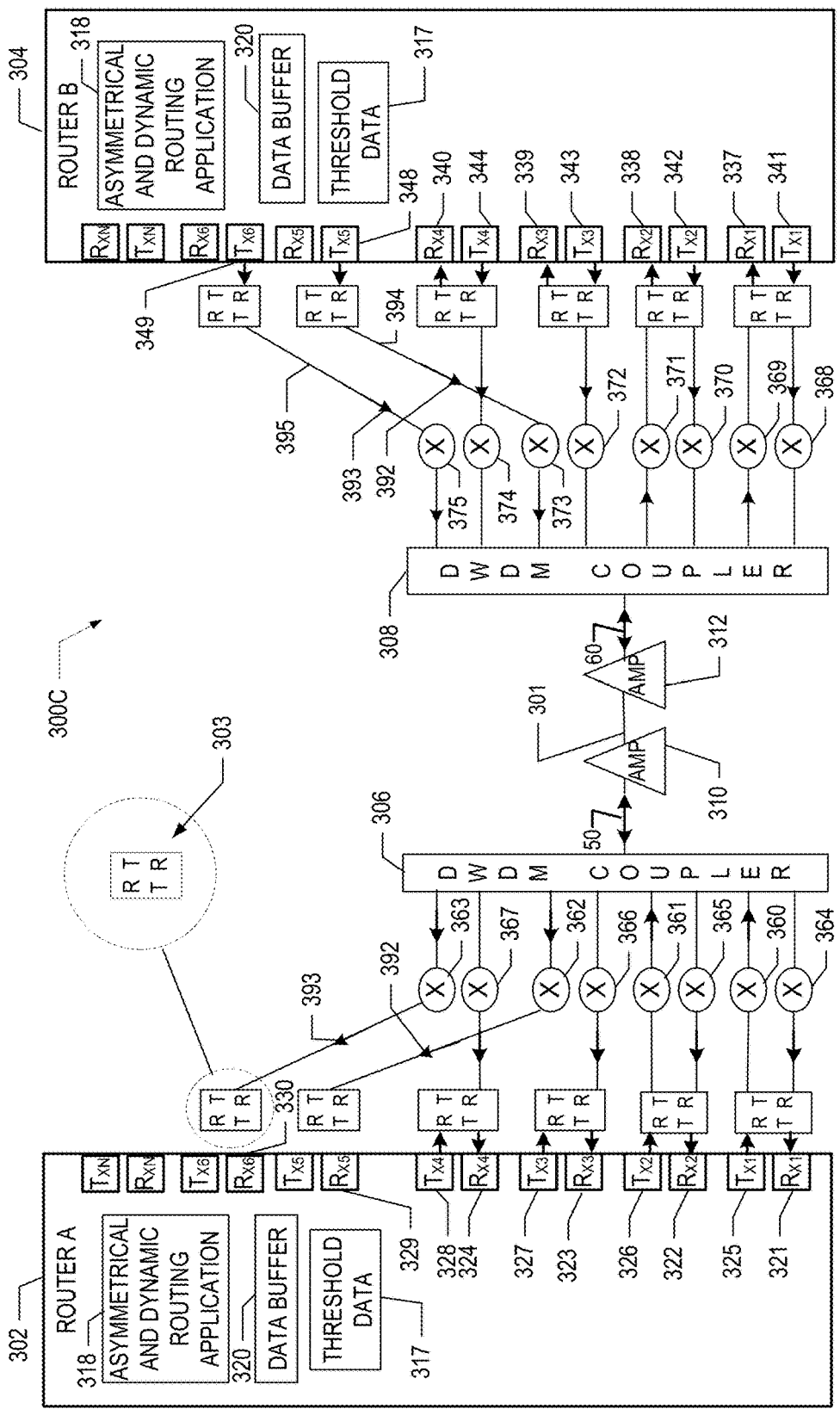

FIG. 3C depicts another exemplary embodiment of an ADRS 300C. In this aspect, a plurality of optical transport layers (OTL) components, as indicated by arrow 303, are connected between the network device ports (e.g., transmit and receive ports) and the mirrors. In this aspect, each OTL component 303 is used to convert a generic wavelength such as 1310 nm or 1550 nm signal into a very specific color of light such as 1557.35 nm (e.g., see the ITU channel plan for specific wavelengths) and may or may not modify the signal structure, such as one in which a signal is modified when encapsulated from an OC192 signal into a G.709 ODU2 signal. These OTL components 303 can also be used to manage amplification balancing and wave balancing of data signals being communicated between network device A 302 and network device B 304. For example, in this aspect, each of transmit and receive ports of network device A 302 and network device B 304 are configured to transmit data signals at the same generic wavelength (e.g., 1310 nanometers). The OTL components 303 are used to convert the data signals to a specified wavelength (e.g., $\lambda_1$, $\lambda_2$, $\lambda_3$, etc.) for connecting to the DWDM couplers 306, 308 at the corresponding wavelength ports.

For purposes of illustration ADRS 300A, ADRS 300B, and ADRS 300C are described herein as comprising two network devices, however it is contemplated that ADRS 300A, ADRS 300B, and ADRS 300C may include one or more additional network devices that are each configured to communicate with each other to dynamically exchange bandwidth capacity and to increase their throughput to reduce latency or retransmissions due to congestion when transmitting high bandwidth demanding data. For example, if both network device A 302 and network device B 304 are both transmitting data signals at or above a maximum or threshold bandwidth capacity, they are unable to leverage bandwidth capacity with each other. In such a circumstance, network device A 302, network device B 304, or both can be configured to leverage available and excess bandwidth capacity at one or more other remote network devices. FIG. 3D depicts another exemplary embodiment of an ADRS 300D in which more than two network devices (e.g., network devices A-F, Y, and Z) are connected via a mesh configuration and communicate with each other to leverage bandwidth capacity. Hence, any number of properly configured network devices may exchange bandwidth information by way of the protocol discussed herein and through the data packet exchanged between network devices.

FIG. 3D is an example of a mesh network with a plurality of network devices A-Z where the various network devices are configured to perform asymmetric and dynamic routing according to aspects of the present disclosure. For example, each network device may include an ADRS application as discussed herein. Besides ADRS, the network includes conventional intelligence and applications that may identify a failure within the network, such as a node failing or being rendered temporarily inoperative, a cut line, network maintenance, etc. When such an event occurs, conventional routing is able to redirect packets around the inoperative network area. The ADRS is also able to redistribute routing capacity mismatches and bottlenecks that may be instigated by the network problems.

Figure 4:
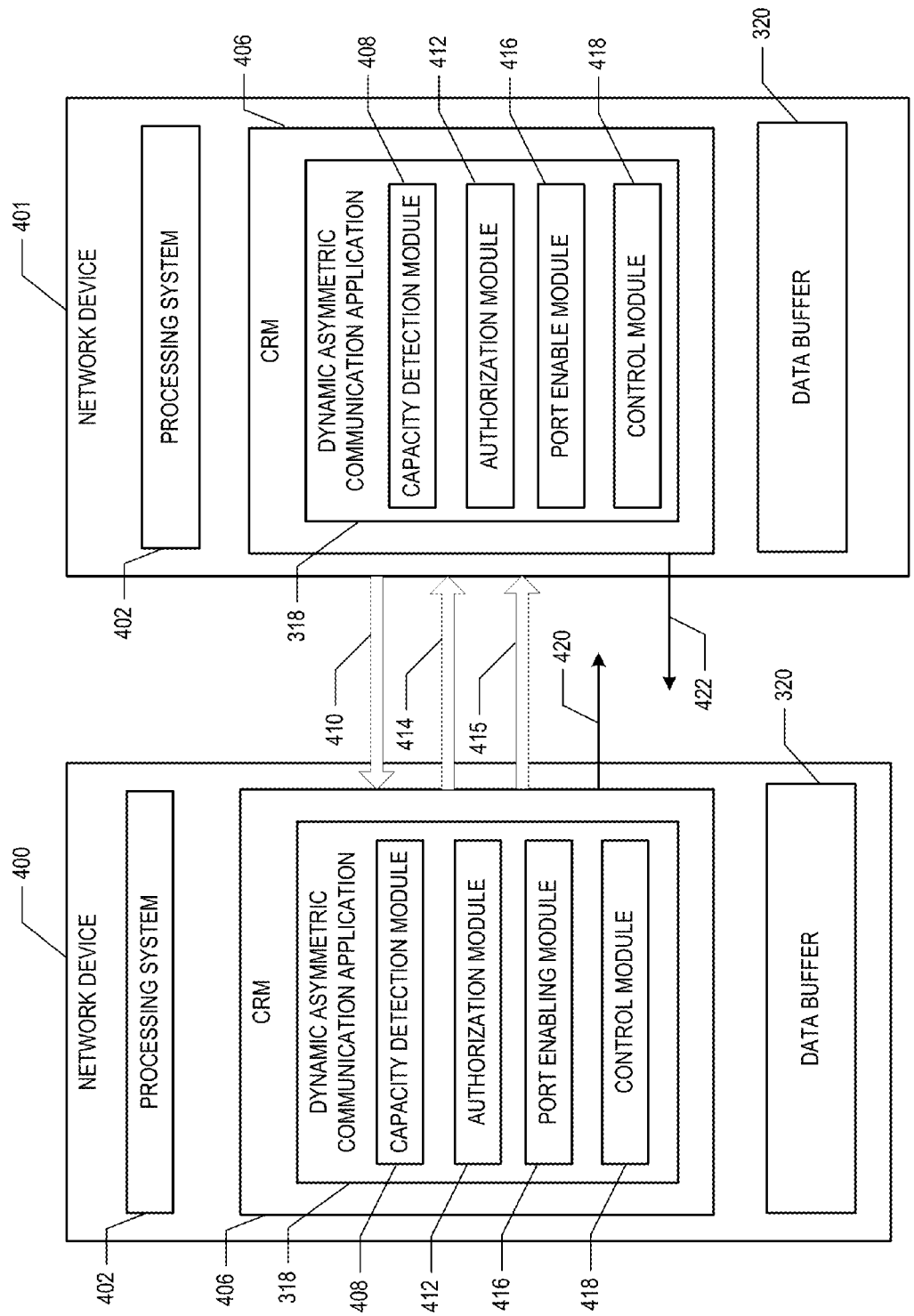
FIG. 4 is a block diagram of asymmetrical and dynamic routing application according to one aspect of the asymmetrical and dynamic routing system.

FIG. 4 is a block diagram depicting an exemplary ADRA 318 executing on a routing device 400 and a remote routing device 401. According to one aspect, the routing device 400 and the remote routing device 401 each includes a processing system 402 that includes one or more processors or other processing devices. The processing system 402 executes the ADRA 318 to enable one or more idle transmit ports at the routing device and to transmit one or more control signals (e.g., control signals 420 and 422) to one or more of the light redirecting components to redirect one or more data signals being transmitted from the routing device 400 to one or more of the idle receive ports at a remote routing device 401.

According to one aspect, the routing device 400 and the remote routing device 401 each includes a computer readable medium ("CRM") 406 configured with the ADRA 318. The ADRA 318 includes instructions or modules that are executable by the processing system 402 to dynamically control bandwidth capacity of the routing device 400 and a remote routing device 401.

The CRM 406 may include volatile media, nonvolatile media, removable media, non-removable media, and/or another available medium that can be accessed by the routing device 400 By way of example and not limitation, the CRM 406 comprises computer storage media and communication media. Computer storage media includes non-transient memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

As depicted in FIG. 4, both the routing device 400 and the remote routing device 401 are configured to execute ADRAs 318. For purposes of illustration, the execution of the exemplary ADRAs 318 are described below in the context of the remote routing device 401 requesting additional bandwidth capacity for receiving data signals at the routing device 400 that are transmitted from remote routing device 401.

A capacity detection module 408 of the ADRA 318 of the remote routing device 401 monitors a current data transmission load or bandwidth at one or more transmit ports of the remote routing device 401. The capacity detection module 408 compares the current data transmission load to threshold port bandwidth data 317 retrieved from the data buffer 320 of the remote routing device 401 to determine if a threshold bandwidth capacity has been reached at one or more transmit ports. For example, according to one aspect, the capacity detection module 408 monitors a queue or buffer capacity of the remote routing device 401.

The capacity detection module 408 compares the current data transmission load at each transmit port to a corresponding maximum bandwidth capacity of each transmit port as defined by threshold port bandwidth data 317. In one example, the current data transmission load may correspond to the capacity of a memory buffer of the network device or tributary buffer associated with one or more transmit ports. The maximum bandwidth capacity may correspond to a specified percentage of transmission or tributary buffer capacity (e.g., 90% or 95%). If the remote routing device 401 has a current data transmission load that is less than a corresponding maximum bandwidth capacity, the capacity detection module 408 continues to monitor the current data transmission load of each transmit port or otherwise storing data packets prior to transmission. If one or more of the transmit ports for the remote routing device 401 has a current data transmission load that is equal to or exceeds the corresponding maximum bandwidth capacity for the one or more transmit ports, the capacity detection module 408 generates a bandwidth request 410 that is transmitted via a communication protocol to the routing device 400. According to one aspect, the bandwidth request 410 identifies the remote routing device 401 (or source requesting node) and specifies that it has exceeded its maximum bandwidth capacity. The communication protocol may also require that the bandwidth request 410 identify an additional bandwidth required (e.g., bandwidth capacity of 20 Gb/s) for accommodating the transmission of additional data signals from the remote routing device 401 to the routing device 400 and/or the specific wavelength, $\lambda$, or optical channel of the additional data signals.

According to one aspect, the communication protocol uses an in-band communication for communicating the bandwidth request 410, the bandwidth authorization notification 414, and/or the bandwidth denial notification 415 between network device A 302 and network device B 304. Such in-band communication may involve communicating using existing receive and transmit ports of network device A 302 and network device B 304 that are associated with a specific wavelength, λ, or optical channel. For example, the bandwidth request 410, the bandwidth authorization notification 414, and the bandwidth denial notification 415 may be communicated via transmit port 325 and receive port 321 of network device A 302 and transmit port 341 and receive port 337 network device B 304, although no specific port or wavelength is required.

In another aspect, the communication protocol uses out-of-band communication for communicating the bandwidth request 410, the bandwidth authorization notification 414, and the bandwidth denial notification 415 between network device A 302 and network device B 304. Such out-of-band communication may involve communicating via separate dedicated receive and transmit ports that are not associated with traffic bearing optical channels. For example, the bandwidth request 410, the bandwidth authorization notification 414, and the bandwidth denial notification 415 may be communicated via dedicated protocol communication ports (not shown) of network device A 302 and network device B 304. Alternatively, the communication protocol may use a non-data (traffic or sellable service) bearing wavelength between existing ports. For example, traffic bearing channels may use the ITU channel plan in the range of 1525 nm to 1565 nm, while the OOB communication channels may use 1310 nm network device A 302 to network device B 304 and 1425 nm network device B 304 to network device A 302.

In another aspect, in reference to the OTLs 303 described above in reference to FIG. 3C, the communication protocol may also require that the bandwidth request 410 identify a specified wavelength for each OTL component 303. Thereafter, the OTL component 303 linked to a particular transmit port will convert a transmitted data signal having a generic wavelength to a corresponding specified wavelength. The OTL component 303 linked to a particular receive port will convert a received data signal having a specified wavelength to the generic wavelength.

An authorization module 412 of the ADRA 318 of the routing device 400 receives the bandwidth request 410 and determines the current data transmission load of the routing device 400. If the sum of the additional bandwidth identified in the bandwidth request 410 and the current data transmission load of the routing device 400 is below a maximum data transmission capacity retrieved from the data buffer 320 of the routing device 400, the authorization module 412 generates and transmits a bandwidth authorization notification 414 to remote routing device 401. According to another aspect, if the sum of a current data transmission load of the routing device is equal to or greater than the maximum data transmission capacity retrieved from the data buffer 320, the authorization module 412 generates and transmits a bandwidth denial notification 415 to remote routing device 401.

A port enabling module 416 of the ADRA 318 of the routing device 400 enables one or more idle receive ports at the routing device 400 to accommodate the desired bandwidth of additional data signals. For example, if a bandwidth authorization notification 414 is generated and the bandwidth request 410 indicates an additional bandwidth of 5 Gb/s and the routing device 400 includes additional receive ports that can accommodate 10 Gb/s each, the port enabling module 416 enables one of the additional receive ports and disables an active transmit port. As another example, if the bandwidth request 410 indicates a desired bandwidth of 15 Gb/s, the port enabling module 416 enables two of the additional receive ports and disables two of the active transmit ports. It is also contemplated that in other aspects, the port enabling module 416 may only enable enough receive ports to accommodate a portion of the desired bandwidth.

According to another aspect, the port enabling module 416 of the ADRA 318 of the routing device 400 enables one or more idle receive ports at the routing device 400 to accommodate the desired bandwidth of additional data signals for one or more corresponding wavelengths in response to the generated bandwidth authorization notification 414. For example, if a bandwidth authorization notification 414 is generated and the bandwidth request 410 indicates an additional bandwidth of 5 Gb/s at a specified third wavelength Red $\lambda_3$ and the routing device 400 includes an additional receive port (e.g., receive port 329) that can accommodate receiving 10 Gb/s at the specified third wavelength Red $\lambda_3$, the port enabling module 416 enables that particular additional receive port. In this example, the port enabling module 416 simultaneously disables a corresponding active transmit port transmitting at the specified third wavelength Red $\lambda_3$ (e.g., transmit port 327.)

The port enabling module 416 of the ADRA 318 of the remote routing device 401 enables one or more idle transmit ports at the remote routing device 401 to transmit the additional bandwidth in response to the bandwidth authorization notification 414 received from the routing device 400. For example, if the bandwidth authorization notification 414 indicates a desired bandwidth of 5 Gb/s has been authorized and routing device 400 includes additional receive ports that can accommodate 10 Gb/s each, port enabling module 416 of the ADRA 318 enables one of the additional transmit ports (e.g., transmit port 348) and disables an active receive port (e.g., received port 339). As another example, if the bandwidth authorization notification 414 indicates a desired bandwidth of 15 Gb/s has been authorized, the port enabling module 416 enables two of the additional transmit ports and disables two active receive ports.

According to another aspect, the port enabling module 416 of the ADRA 318 of the remote routing device 401 enables one or more idle transmit ports at the remote routing device 401 to transmit the desired bandwidth of additional data signals for one or more corresponding wavelengths in response to the generated bandwidth authorization notification 414. For example, if a bandwidth authorization notification 414 is generated and the bandwidth request 410 indicates an additional bandwidth of 5 Gb/s at a specified third wavelength $\lambda_3$ and the routing device 400 includes an additional transmit port (e.g., transmit port 348) that can accommodate transmitting 10 Gb/s at the specified third wavelength $\lambda_3$, the port enabling module 416 enables that particular additional transmit port. In this example, the port enabling module 416 simultaneously disables a corresponding active receive port receiving data signals at the specified third wavelength $\lambda_3$ (e.g., receive port 339.)

The control module 418 of the ADRA 318 of the routing device 400 generates one or more control signals 420 in response to the generated bandwidth authorization notification 414. The control module 418 transmits the one or more control signals 420 to one or more corresponding light redirecting components located at the transmit ports of the routing device 400 to reposition or the one or more corresponding light redirecting components to redirect one or more additional data signals transmitted from the remote routing device 401 to the newly enabled received ports at the routing device. According to one aspect, a light redirecting component is responsive to the control signal to reposition by the required amount to redirect or arc the one or more additional data signals transmitted from the remote routing device 401 toward the newly enabled received ports at the routing device 400. Referring briefly to FIG. 3A as an example, if two additional receive ports 329, 330 have been enabled at the network device A 302 in response to the bandwidth request signal 410, the control module 414 transmits the one or more control signals 420 to corresponding light redirecting components 362, 363 to reposition the light redirecting components and redirect the additional data signals 396, 397 received from the routing B 304 to the two newly enabled receive ports 329, 330 at network device A 302.

Similarly, the control module 418 of the ADRA 318 of the remote routing device 401 generates one or more control signals 422 in response to the received bandwidth authorization notification 414. The control module 418 of the remote routing device 401 transmits the one or more control signals 422 to one or more corresponding light redirecting components located at the receive ports of the remote routing device 401 to reposition the one or more corresponding light redirecting components to receive the one or more additional data signals transmitted from the additional transmit ports enabled at the remote routing device 401. For example, each light redirecting component is responsive to a control signal to reposition by the required amount to arc or direct the one or more additional data signals transmitted from the additional transmit ports enabled at the remote routing device 401 to the routing device 400 via the DWDM couplers 306 and 308.

According to one aspect, the ADRAs 318 use a protocol, such as a Link Aggregation Control Protocol (LACP), to combine or aggregate multiple transmit and receive ports into a logical interface to enable dynamic adjustment of the number of ports included in the aggregated whole of traffic flow. This allows the transmission of data to be indifferent to which transmit port of a network device from which it originates since all ports are aggregated together to form a single logical port. In addition, the communication of the bandwidth request 410, the bandwidth authorization notification 414, bandwidth denial notification 415, and any other communications between the routing device 400 and remote routing device 401 may occur in band via dedicated transmit and receive ports. For example, and referring to FIGS. 3A and 3B communications may be transmitted from the transmit port 341 of remote network device B 304 to the receive port 321 of the network device A 302 and communications may be transmitted from the transmit port 325 of network device A 302 to the receive port 337 of the remote network device B 304.

Figure 5:
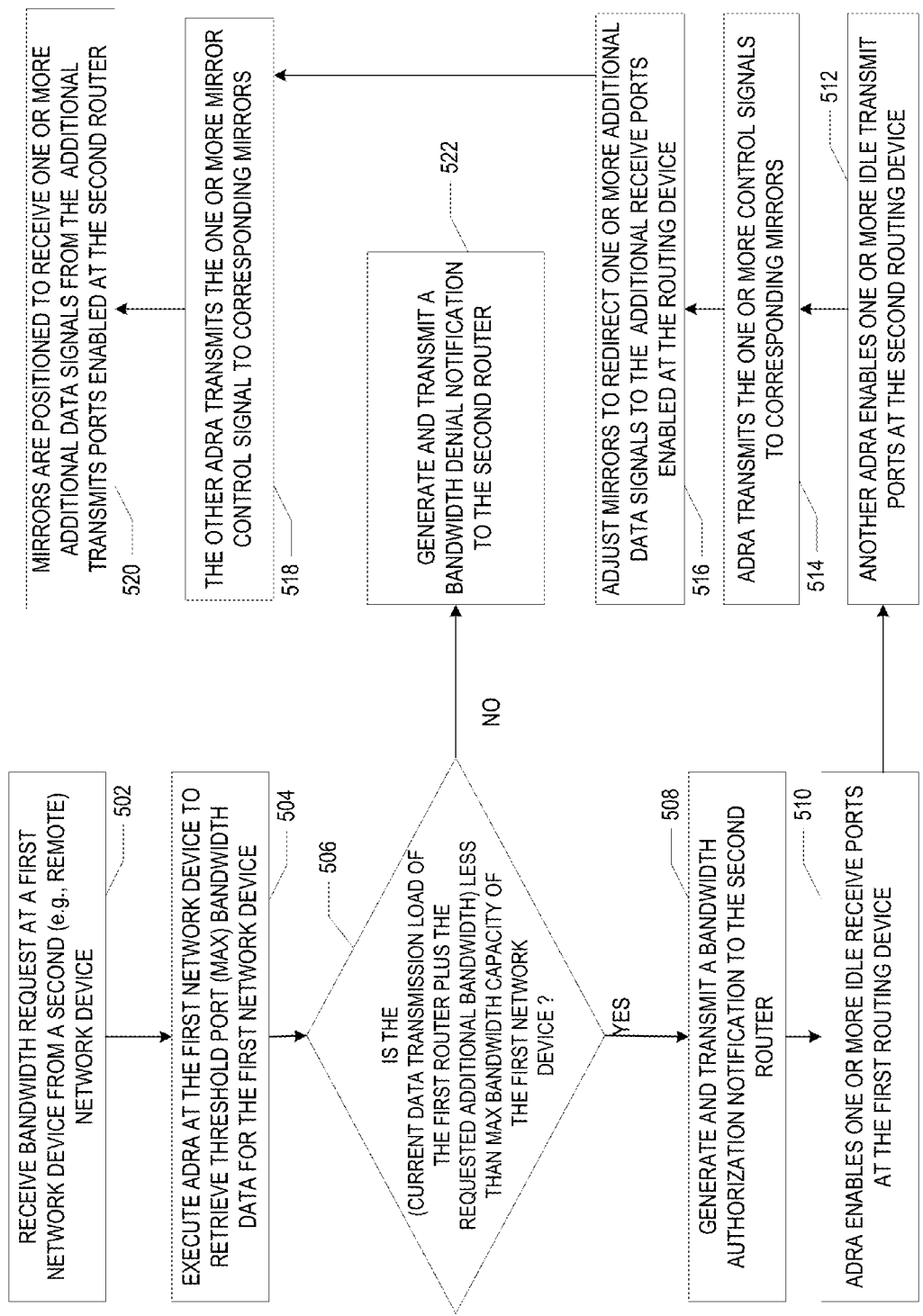
FIG. 5 illustrates a method for enabling dynamic and asymmetric bandwidth capacity adjustment between two or more network devices according to one aspect of the asymmetrical and dynamic routing system.

FIG. 5 is a flow chart that illustrates an exemplary method for enabling dynamic and asymmetric bandwidth capacity adjustment between two or more network devices exchanging data. A bandwidth request is received at a routing device from a remote routing device at 502. As described above, the bandwidth request identifies, in part, the additional bandwidth required for accommodating additional data signals to be allocated and subsequently transmitted from the remote routing device. At 504, an ARDA is executed at the routing device to retrieve threshold port bandwidth data for the routing device from a data buffer. The ARDA determines whether the routing device can accommodate the desired bandwidth amount by comparing the sum of a current data transmission load of the routing device and the additional bandwidth required to the threshold port bandwidth data at 506. For example, consider network device A 302 is currently transmitting below max capacity (e.g., below 50% or 20 G of total 40) and network device B desires to allocate 20 gigabytes in the B to A direction. If A acknowledges or accepts the request, wavelength channels Red $\lambda_3$ and $\lambda_4$ flip directions. If a denial occurs, then network device B may try to leverage available bandwidth at other network devices such as C, D or F (see FIG. 3D) and then C, D or F try to allocate new waves to network device A.

Figure 6A:
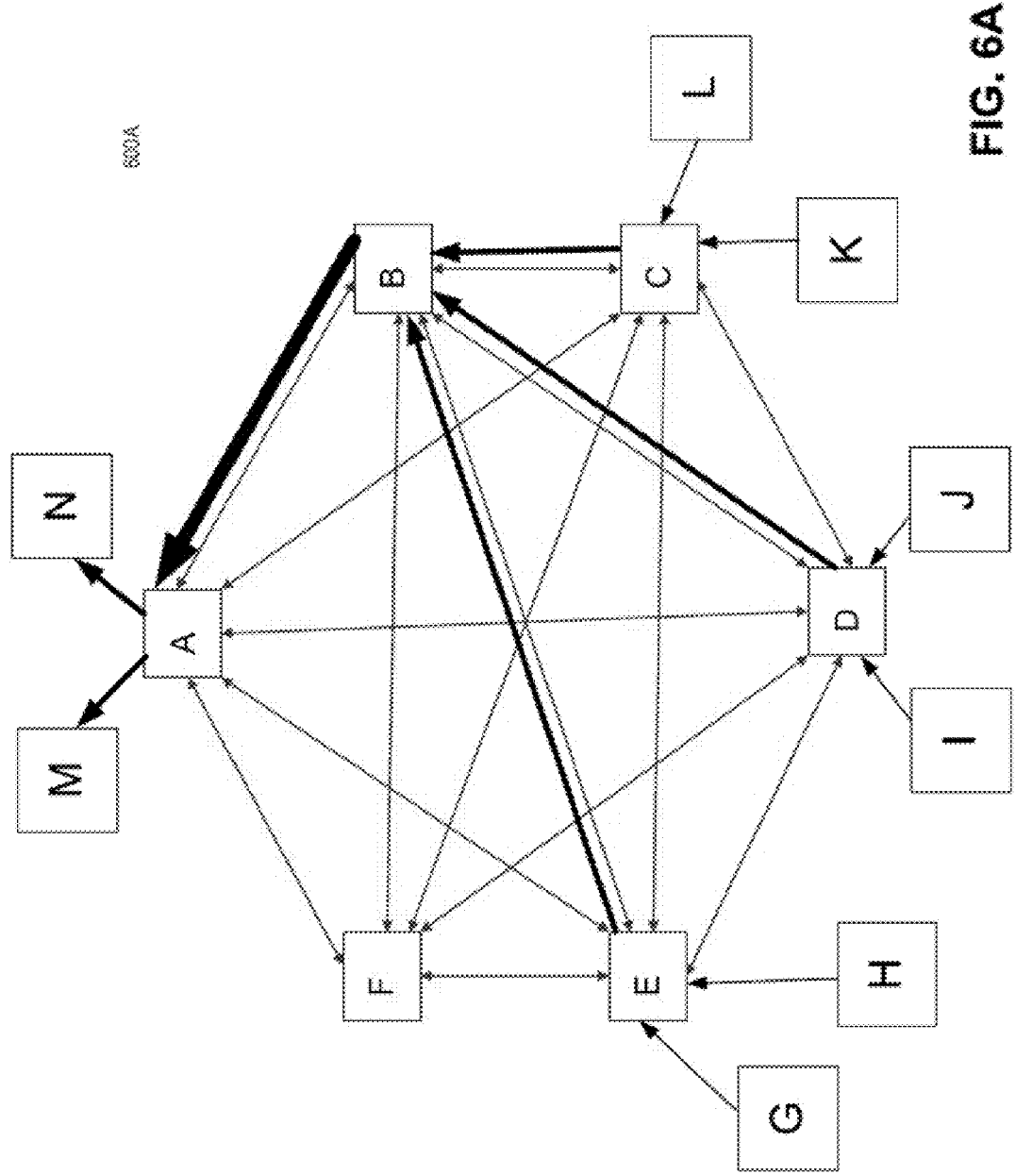
FIGS. 6A-6C are block diagrams of multiple network devices connected in a mesh configuration according to aspects of the asymmetrical and dynamic routing system.
Figure 6B:
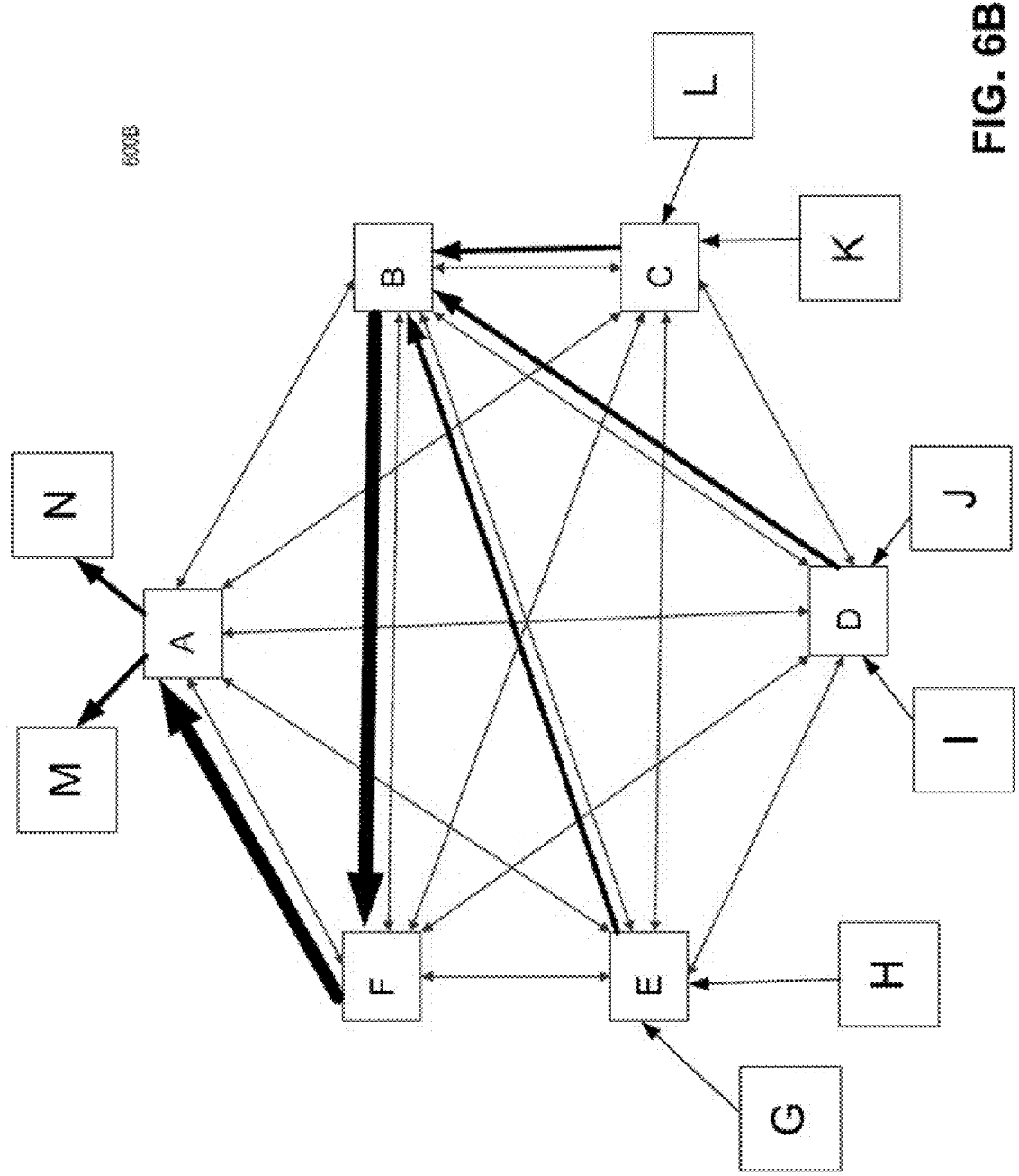
Figure 6C:
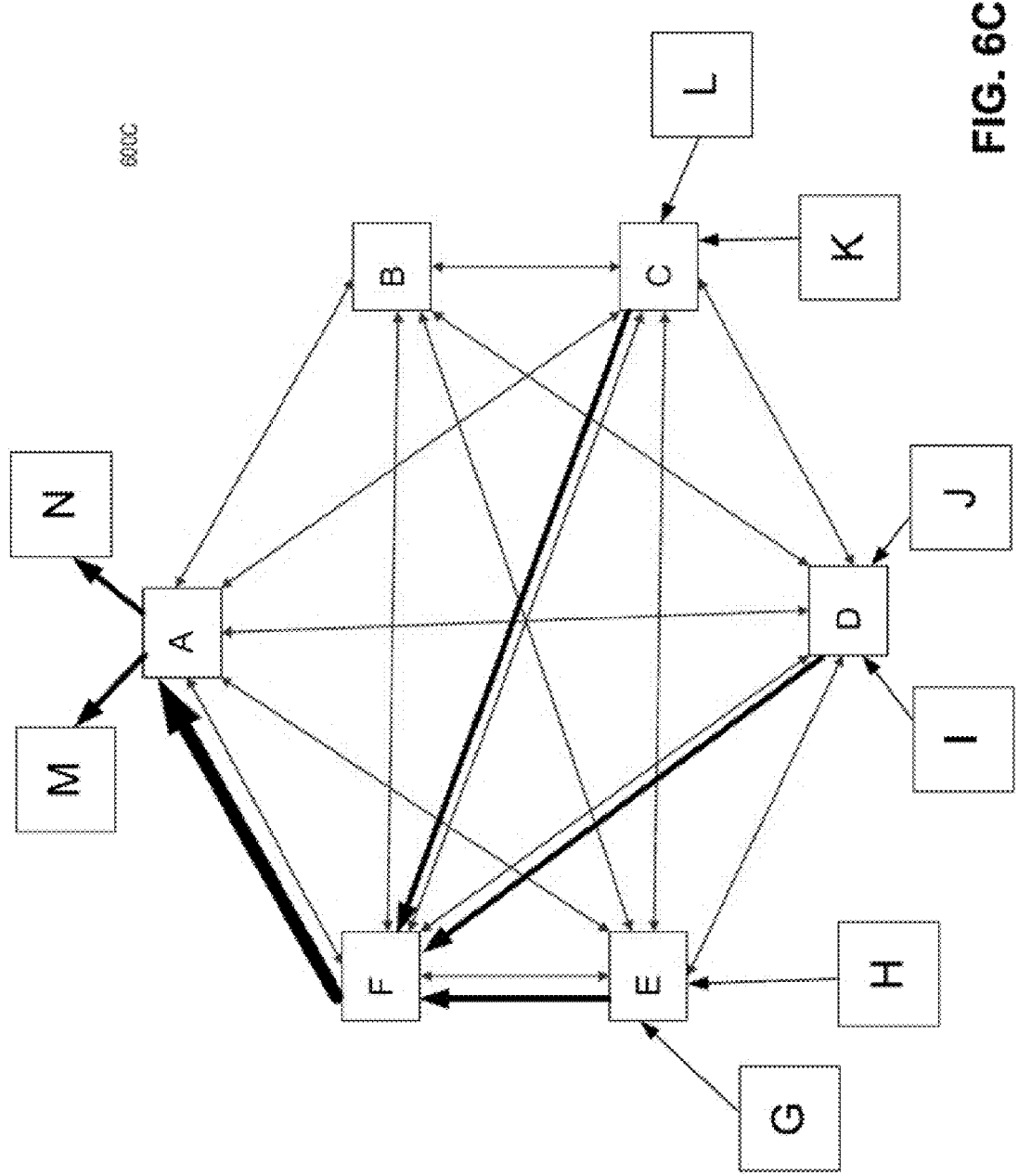

Similar to FIG. 3D, FIGS. 6A, 6B, and 6C depict other exemplary embodiments of an ADRS 600A, 600B, and 600C, respectively, in which more than two network devices (e.g., network devices A-F), or nodes, are connected via a mesh configuration and communicate with each other to leverage bandwidth capacity. Hence, any number of properly configured network devices may exchange bandwidth information by way of the protocol discussed herein and through the data packet exchanged between network devices. FIGS. 6A, 6B, and 6C are examples of a mesh network with a plurality of network devices A-F where the various network devices are configured to perform asymmetric and dynamic routing according to aspects of the present disclosure. For example, each network device may include an ADRS application as discussed herein. Besides ADRS, the network includes conventional intelligence and applications that may identify a failure within the network, such as a node failing or being rendered temporarily inoperative, a cut line, network maintenance, etc. When such an event occurs, conventional routing is able to redirect packets around the inoperative network area. The ADRS is also able to redistribute routing capacity mismatches and bottlenecks that may be instigated by the network problems. FIGS. 6A, 6B, and 6C also depict upstream network devices G and H, I and J, and K and L, that are configured to transmit various data traffic to mesh network devices E, D, and C, respectively. Likewise, downstream network devices M and N are configured to receive various data traffic from mesh network device A.

Referring to the example embodiment of FIG. 6A, network device B transmits data traffic to network device A, and network devices E, D, and C each transmit at least some of this data traffic to network device A via network device B. In this example embodiment, the ADRS application(s) associated with network devices in the mesh network perform asymmetric and dynamic routing in accordance with aspects of the present disclosure.

In the example embodiment of FIG. 6B, assume that the ADRS application(s) were unable to perform asymmetric and dynamic routing between network devices A and B. This could be due to one or more of a denial, network failure, maintenance, etc. In such a scenario, the ADRS application(s) associated with network devices in the mesh network can attempt to negotiate (or initiate negotiations for) asymmetric and dynamic routing between network devices B and F, and between network devices F and A. If enabled, network device B would be dynamically reconfigured to asymmetrically transmit data traffic to network device A via network device F; network device F would be dynamically reconfigured to asymmetrically receive data traffic from network device B and to asymmetrically transmit data traffic to network device A; and network device A would be dynamically reconfigured to asymmetrically receive data traffic from network device F, in accordance with aspects of the present disclosure.

In the example embodiment of FIG. 6C, assume that the ADRS application(s) were unable to perform asymmetric and dynamic routing between network devices A and B and/or were unable to perform asymmetric and dynamic routing between network devices B and F, and between network devices F and A. This could also be due to one or more of a denial, network failure, maintenance, etc. In such a scenario, the ADRS application(s) associated with network devices in the mesh network can attempt to negotiate (or initiate negotiations for) asymmetric and dynamic routing from network devices E, D, and C to network device F (i.e., for at least some of the data traffic associated with transmissions from each of network devices E, D, and C), and then from network device F to network device A. If enabled, network devices E, D, and C would be dynamically reconfigured to asymmetrically transmit respective portions of data traffic to network device F; network device F would be dynamically reconfigured to asymmetrically receive respective portions of data traffic from network devices E, D, and C, and to asymmetrically transmit data traffic to network device A; and network device A would be dynamically reconfigured to asymmetrically receive data traffic from network device F, in accordance with aspects of the present disclosure.

According to one aspect, if the sum of a current data transmission load of the routing device is less than a maximum bandwidth capacity specified by the threshold port bandwidth data at 506, the ARDA generates and transmits a bandwidth authorization notification 414 to remote routing device at 508. At 510, the ARDA enables one or more idle receive ports at the routing device to accommodate the additional bandwidth in response to the generated bandwidth authorization notification.

Another ARDA executing on the remote routing device 401 enables one or more idle transmit ports at the remote routing device 400 to accommodate the desired bandwidth in response to the generated bandwidth authorization notification at 512. At 514, the ADRA generates one or more control signals in response to the generated bandwidth authorization notification and transmits the one or more control signals to adjust one or more corresponding light redirecting components located at the transmit ports of the routing device. At 516, the one or more corresponding light redirecting components are repositioned to redirect one or more additional data signals transmitted from the remote routing device 401 to the newly enabled received ports at the routing device 400. At 518, the other ADRA generates one or more control signals in response to the generated bandwidth authorization notification and transmits the one or more control signals to adjust one or more corresponding light redirecting components located at the receive ports of the remote routing device. At 520, the one or more corresponding light redirecting components are repositioned to redirect one or more additional data signals transmitted from the newly enabled transmit ports at the remote routing device to the routing device. If the sum of a current data transmission load of the routing device is equal to or greater than a maximum bandwidth capacity specified by the threshold port bandwidth data at 506, the ARDA generates and transmits a bandwidth denial notification to remote routing device at 522.

Typically, communication links spanning long distances are provided with regenerators for Signal Enhancing typically known as 3R regeneration (i.e., re-amplifying, re-shaping, re-timing) the signals received from a transmitting end point to a quality level sufficient for adequate reception at the receiving end point. Due to this signal degradation, such as any type of dispersion, chromatic dispersion or polarization mode dispersion, over long distances, 3R or a comparable signal enhancing method, such as Dispersion Compensation Modules or Raman Amplification, electronic dispersion compensation methods, must occur. Nevertheless, these regenerators should intelligently ascertain a directional path of each channel of the link, and amplify the signal in that direction for proper operation of the regenerator.

Figure 7B:
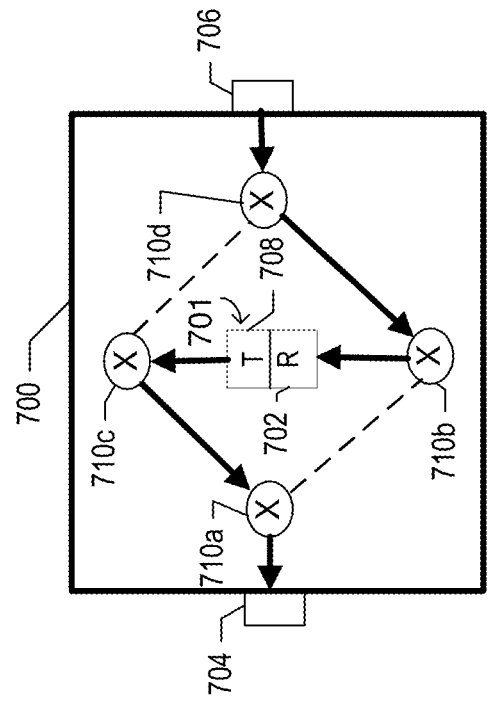
FIGS. 7A and 7B depict an example embodiment of a light redirecting device that may be used with the asymmetrical and dynamic routing system of FIGS. 3A, 3B, 3C, and/or 3D, respectively.
Figure 7A:
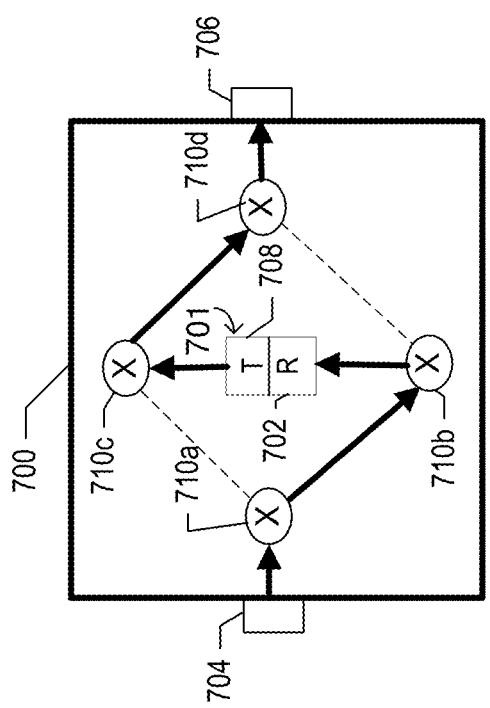

FIGS. 7A and 7B depict various configurations of an exemplary embodiment of a light redirecting device or system 700 that may be used with the ADRSs 300A, 300B, 300C, and/or 300D of FIGS. 3A, 3B, 3C, and/or 3D, respectively, or possibly as a stand-alone unit controlled by any other comparable system. The light redirecting device 700 includes a transmit/receive (T/R) module 701 having a receive portion 702 that alternatively receives a light signal from either a first port 704 or a second port 706 and is coupled to a transmit portion 708 of the T/R module that alternatively transmits the light signal to either the second port 706 or the first port 704, respectively, using an arrangement of optical redirecting elements 710a-710d. That is, each optical redirecting element 710a-710d is configured to reflect or refract an incoming light signal in either one of two directions such that its respective light redirecting device 700 may direct the light signal in a direction suitable for asymmetrical routing.

The light redirecting device 700 may perform 3R regeneration, or other signal enhancing or cleansing method on a light signal in either direction, namely from the first port 704 to the second port 706 as shown in FIG. 7A, or from the second port 706 to the first port 704 as shown in FIG. 7B. The directional amplification of the light signal is controlled by the optical directing elements 710a-710d. Thus, by controlling the operation of the optical directing elements 710a-710d, the redirecting device 700 may perform 3R regeneration, or other signal enhancing or cleansing technique in any desired direction. As shown, active light signal paths are indicated by arrows and inactive (e.g., not currently used) light signal paths are indicated by dashed lines.

FIG. 7A (eastbound) depicts an arrangement of the optical directing elements 710a-710d in which the light signal is directed rightward from port 704 to port 706. In this arrangement, optical directing element 710a reflects or refracts the light signal received from port 704 to optical directing element 710b, which in turn reflects or refracts the light signal to the receive portion 702 of the T/R module 701. Additionally, optical directing element 710c reflects or refracts the light signal emanating from the transmit portion 708 to optical directing element 710d, which in turn reflects or refracts the light signal to port 706.

In contrast, FIG. 7B (westbound) depicts an alternative arrangement of the optical directing elements 710a-710d in which the light signal is directed leftward from port 706 to port 704. In this arrangement, optical directing element 710d reflects or refracts the light signal received from port 706 to optical directing element 710b, which in turn reflects or refracts the light signal to the receive portion 702 of the T/R module 701. Additionally, optical directing element 710c reflects or refracts the light signal emanating from the transmit portion 708 to optical directing element 710a, which in turn reflects or refracts the light signal to port 704.

Thus, the light redirecting device 700 may alternatively transmit the light signal in opposing directions between the first port 704 and the second port 706 according to the configuration of the optical redirecting elements 710a-710d. As shown, a single T/R module 701 is used to alternatively transmit light from the first port 704 to the second port 706, or transmit light from the second port 706 to the first port 704. This functionality differs from that of the optical transport layer (OTL) component 303 shown in FIG. 3C in which two T/R modules are used. The two T/R modules include a tributary side T/R module (typically 1310 nm) and a network side T/R module (typically DWDM wavelength specific, such as 1557.52 nm). The OTL component 303 is fully bidirectional, whereas light redirecting device 700 is meant to take a DWDM wavelength and may change directions (i.e. from eastbound to westbound). Whereas the OTL component 303 alternatively transmits light signals bidirectionally in opposing directions by alternatively turning on/off either T/R module ports, the light redirecting device 700 alternatively transmits a single signal in opposing directions by manipulating the light signal path through a number of optical redirecting elements 710a-710d.

Figure 8A:
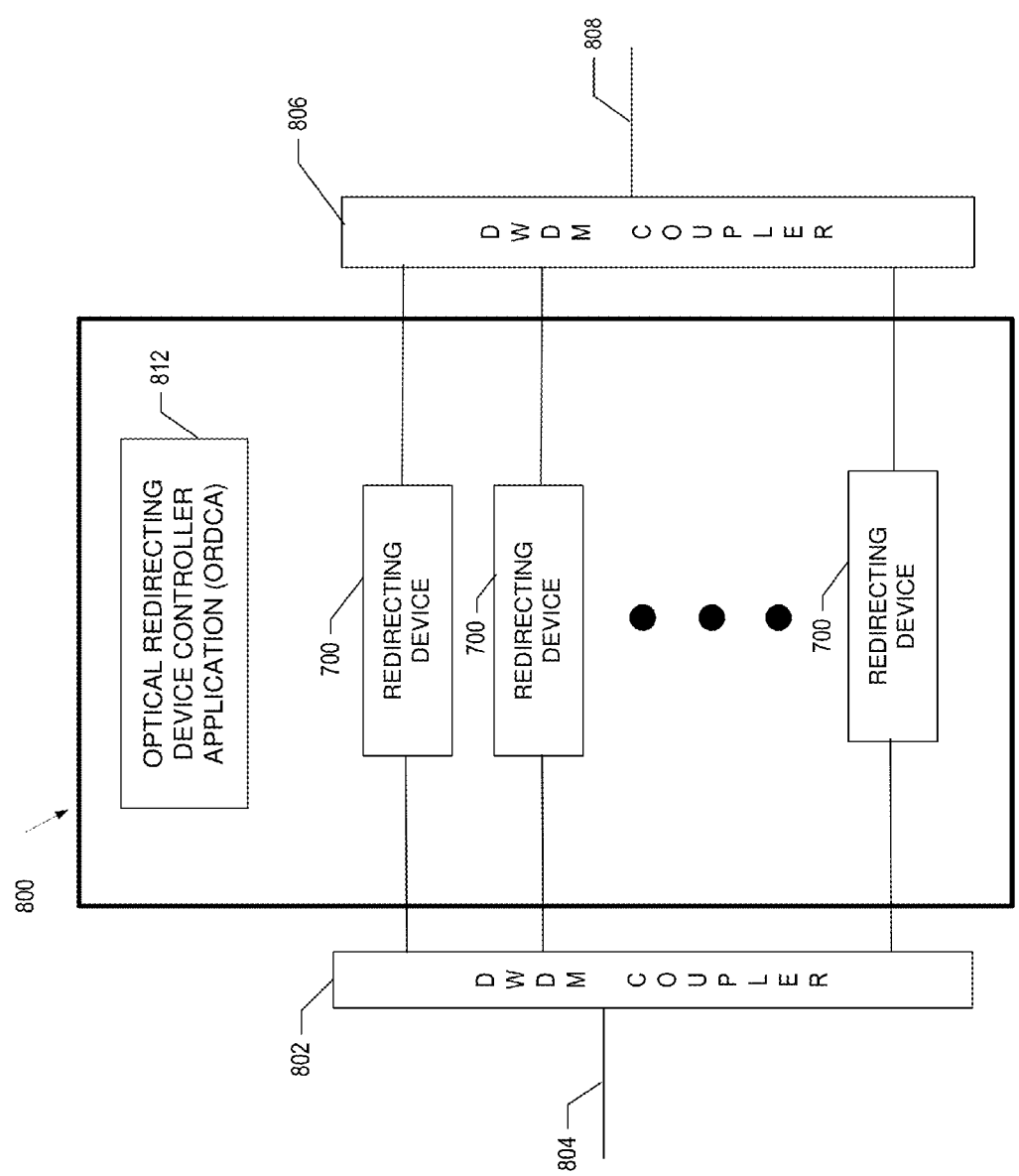
FIGS. 8A and 8B depict an exemplary regenerator that may be used with the asymmetrical and dynamic routing system of FIGS. 3A, 3B, 3C, and/or 3D, respectively.

FIG. 8A depicts an example regenerator 800 according to the teachings of the present disclosure. Embodiments of the regenerator 800 may be used with the ADRSs 300A, 300B, 300C, and/or 300D of FIGS. 3A, 3B, 3C, and/or 3D, respectively. For example, the regenerator 800 may be implemented to improve light signals (re-construct, re-structure, re-shape, re-time, re-amplify), such as light signals of an ADRS, when used between two routers of a communication network that are separated by a relatively long distance due to a natural degradation in the signal quality over those distances.

The regenerator 800 includes multiple light redirecting devices 700 described above with reference to FIGS. 7A and 7B that may be used for regenerating multiple light signals of the ADRS. Nevertheless, it should be understood that the regenerator 800 may be implemented with any suitable light redirecting device that selectively directs light signals. Additionally, the light redirecting device 700 may be implemented on or within any system in which the selective direction of light signals is needed or desired. For example, the regenerator 800 is coupled to a first coupler 802 that may be optically coupled to router A 302 (See FIGS. 3A, 3B, and 3C) using a first optical cable 804 (e.g., fiber 301 of FIGS. 3A-3C) and a second coupler 806 that may be optically coupled to router B 304 using a second optical cable 808 (e.g., fiber 301 of FIGS. 3A-3C).

The regenerator 800 also includes an optical redirecting device controller application (ORDCA) 812 that controls the configuration of the optical redirecting devices 700. In general, the ORDCA 812 controls the optical directing elements 710a-710d of each redirecting device 700 to selectively direct their respective light signals in either direction through the regenerator 800 for synchronizing the direction of channel through the regenerator to the directions using by the routers. The ORDCA 812 is discussed in detail below with respect to FIG. 8B.

In one embodiment, the regenerator 800 may be used to perform 3R regeneration or a comparable signal enhancing technique for each channel of the fiber cable between router A 302 and router B 304. For example, when router A 302 and router B 304 are spaced a relatively long distance (e.g., a distance great enough to degrade the signal) from one another, attenuation of signals transmitted between router A 302 and router B 304 as well as noise introduced in the cable may reduce signal quality at its termination point. Thus, the regenerator 800 may be configured at a suitable location between router A 302 and router B 304 or at multiple locations between A and B to clean (e.g., clean, re-construct, re-configure, re-shape, re-time, and/or amplify) signals and/ or filter noise from the signals such that signal quality may be maintained at a sufficiently high level and sent on to the next location. Additionally, multiple regenerators 800 may be coupled between router A 302 and router B 304 in which the transmit/receive modules each include an amplifier and/ or filter to clean and/or filter light signals of the ADRS.

In one embodiment, the optical redirecting devices 700 provide full grooming of the channels of the fiber optic cable. That is, all, some, or none of the channels may be transmitted in any one direction based upon the configuration of the optical redirecting devices 700. For example, an optical redirecting device 700 may be provided for each channel of the fiber cable such that all, some or none of the signals transmitted through the channels may be directed from router A 302 to router B 304, or that all some or none of the channels may be directed from router B 304 to router A 302. In other embodiments, only one or a specified number of redirecting devices 700 may be implemented such that a specified subset of channels may be selectively directed in opposing directions between router A 302 and router B 304.

Figure 8B:
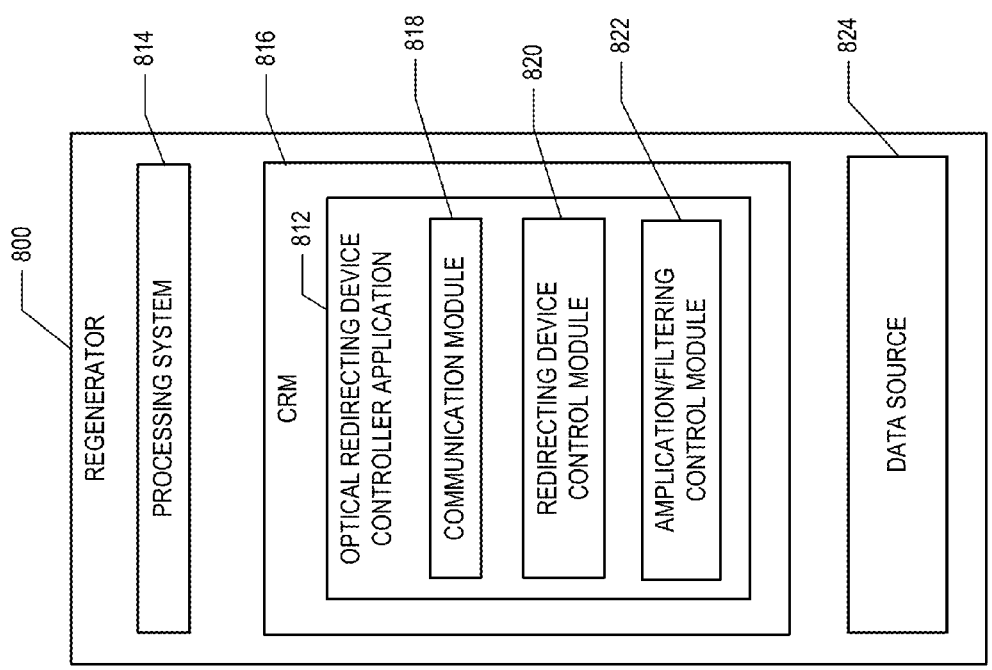

FIG. 8B is an exemplary block diagram depicting an exemplary ORDCA 812 executed on the regenerator 800. According to one aspect, the regenerator 800 includes a processing system 814 that includes one or more processors or other processing devices. The processing system 814 executes the ORDCA 812 to control the configuration of the optical redirecting devices 700.

According to one aspect, the regenerator 800 includes a computer readable medium ("CRM") 816 that stores the ORDCA 812 and a data source 824. The ORDCA 812 includes instructions or modules that are executable by the processing system 814 to dynamically control bandwidth capacity between router A 302 and router B 304 by manipulating the configuration of the optical redirecting devices 700. The data source 824 may be a buffer or queue for temporarily holding data before it is redirected to the proper exit port.

The CRM 816 may include volatile media, nonvolatile media, removable media, non-removable media, and/or another available medium that can be accessed by the regenerator 800. By way of example and not limitation, the CRM 816 comprises computer storage media and communication media. Computer storage media includes non-transient memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

In the specific examples illustrated and discussed herein, a communication module 818 of the ORDCA 812 communicates with the ADRA 318 of either router A 302 and/or router B 304 to receive instructions for configuring the redirecting devices 700, and for reporting performance characteristics of the regenerator 800 and/or signals passed through the regenerator 800. For example, when the ADRA 318 manipulates the directional configuration of any channel of the fiber cable, it will also instruct the regenerator 800 at one or many sites along a route to manipulate the directional configuration of the redirecting devices 700 associated with that channel such that the path of the communication signal of that channel between router A 302 and router B 304 is maintained.

In FIG. 8B, a redirecting device control module 820 of the ORDCA 812 controls the configuration of each redirecting device 700 configured in the regenerator 800. Moreover, the ORDCA 812 synchronizes the direction of each channel of the link with each channel as configured in the routers. For example, the redirecting device control module 820 controls the optical redirecting elements 710*a*-710*d* to reflect and/or refract the light signal in accordance with a desired direction of the path of the associated channel.

The redirecting device control module 700 may also detect a fault condition of any channel and report the fault condition to the ADRA 318 via the communication module 818. For example, a light directing device 710*b* configured on a particular redirecting device 700 may have failed such that it is no longer capable of reflecting or refracting its light signal from light directing device 710*d* to the receive portion 702 of the T/R module 701. In this case, the receive portion 702 of the T/R module 701 will then generate a loss of signal (LOS) alarm when its respective redirecting device 700 is arranged to direct its light signal from port 706 to port 704. The redirecting device control module 820 processes the LOS alarm and transmits information associated with the LOS alarm to the ADRA 318 through the communication module 818.

An amplification/filtering control module 822 controls any cleaning and/or filtering to be applied each redirecting device 700. The cleaning and/or filtering applied to each redirecting device 700 may be applied according to any suitable criteria. In one embodiment, cleaning and/or filtering to each redirecting device 700 may be applied as a closed-loop (e.g., sense and response) system in which the module 822 receives measurements associated with the signal quality from sensors that measure one or more characteristics the light signal, and adjusts the cleaning and/or filtering applied to the light signal according to the received measurements. One or more of the sensors may be configured within each redirecting device 700, or one or more of the sensors may be configured at either or both routers in which the module 822 receives the measurements provided by the ADRA 318 and received through the communication module 822.

In another embodiment, the module 822 may apply cleaning and/or filtering to each redirecting device 700 according to generic information known about the ADRS. For example, it may be known that the physical communication line between each router is approximately 35 miles in length. Given this known length, the module 822 may apply a certain amount of cleaning and/or filtering based upon this known length to condition the light signal for suitable reception at its received point.

It should be appreciated that the modules described herein are provided only as an example of a computing device that may execute the ORDCA 812 according to the teachings of the present invention, and that other computing devices may have the same modules, different modules, additional modules, or fewer modules than those described herein. For example, one or more modules as described in FIG. 8B may be combined into a single module. As another example, certain modules described herein may be encoded and executed on other computing devices, such as the computing device configured in router A 302 or router B 304. Further, one or more or all of the modules may be stored and executed by the ORDCA 812 while data and instructions are transmitted to and from router A 302 and/or router B 304 to execute their functions.

Although the regenerator 800 has been described herein as being adapted for use with a fiber optic cable link with multiple channels using differing wavelengths of light, it should be understood that the regenerator 800 may be used with any communication medium that provides multiple channels in which the direction of signals of any one of these channels may be individually selected relative to the other channels.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A regenerator system enabled for dynamic and asymmetric bandwidth capacity adjustment when exchanging data between a first remote network device and a second remote network device, the regenerator system comprising: a first coupler in communication with the first remote network device using a first communication medium operable to provide a plurality of communication channels; a second coupler in communication with the second remote network device using a second communication medium operable to provide the plurality of communication channels; and a computing device comprising at least one memory for storage of an optical redirecting device controller application executed on at least one processor to: control one or more redirecting devices for selectively configuring at least one of the plurality of communication channels for, in response to a first request from at least one of the first and second network devices, transmission of a signal from the first remote network device to the second remote network device, and, in response to a second request from at least one of the first and second remote network devices, reversing the at least one of the channels for transmission of the signal from the second remote network device to the first remote network device; receive measurements associated with a quality of the signal; based on the received measurements, adjust at least one of cleaning and filtering applied to the signal.

2. The regenerator system of claim 1, wherein the first and second communication medium comprises first and second fiber optic cables, and the one or more redirecting devices comprises at least one light redirecting device.

3. The regenerator system of claim 2, wherein the first and second remote network devices comprise dense wavelength division multiplexing (DWDM) devices, and the plurality of communication channels configured to transmit a plurality of light signals having differing wavelengths relative to one another.

4. The regenerator system of claim 1, wherein the one or more redirecting devices comprises two transmit/receive modules for each channel.

5. The regenerator system of claim 1, wherein the processor is further configured to control the one or more redirecting devices to:
selectively couple the first coupler to a receive portion of a T/R module and the second coupler to a transmit portion of the T/R module; and
selectively couple the second coupler to a receive portion of the T/R module and the first coupler to a transmit portion of the T/R module.

6. The regenerator system of claim 1, wherein a transmit/receive module of the one or more redirecting devices comprises performs at least one of re-shaping the signal, re-amplifying the signal, re-synchronizing the signal, re-configuring the signal, and re-constructing the signal.

7. The regenerator system of claim 1, wherein the one or more redirecting devices comprise are equal in quantity to the number of the plurality of communication channels.

* * * * *